(12) United States Patent
Beidas et al.

(10) Patent No.: US 9,203,680 B2
(45) Date of Patent: Dec. 1, 2015

(54) FORWARD ERROR CORRECTION DECODER INPUT COMPUTATION IN MULTI-CARRIER COMMUNICATIONS SYSTEM

(71) Applicant: HUGHES NETWORK SYSTEM,LLC, Germantown, MD (US)

(72) Inventors: Bassel Beidas, Alexandria, VA (US); Rohit Iyer Seshadri, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 13/622,348

(22) Filed: Sep. 18, 2012

(65) Prior Publication Data

US 2014/0079160 A1   Mar. 20, 2014

(51) Int. Cl.
  H04L 27/06   (2006.01)
  H04L 27/38   (2006.01)
  H04L 25/06   (2006.01)

(52) U.S. Cl.
  CPC .............. *H04L 27/38* (2013.01); *H04L 25/067* (2013.01)

(58) Field of Classification Search
  CPC ................................ H04L 1/0054; H04L 1/20
  USPC .......................................... 375/262, 341, 346
  See application file for complete search history.

(56) References Cited

U.S. PATENT DOCUMENTS

| | | | |
|---|---|---|---|
| 6,252,912 B1 * | 6/2001 | Salinger ........................ | 375/278 |
| 6,904,110 B2 * | 6/2005 | Trans et al. ................... | 375/350 |
| 7,671,789 B1 * | 3/2010 | Yu ................................ | 342/152 |
| 7,920,599 B1 * | 4/2011 | Subramanian et al. ....... | 370/509 |
| 8,442,141 B1 * | 5/2013 | Zhang et al. .................. | 375/267 |
| 2002/0095640 A1 * | 7/2002 | Arad et al. ..................... | 714/792 |
| 2003/0185319 A1 * | 10/2003 | Kolze ............................ | 375/347 |
| 2007/0041478 A1 * | 2/2007 | Kolze ............................ | 375/341 |
| 2012/0051468 A1 | 3/2012 | Weitkemper et al. | |
| 2012/0200897 A1 * | 8/2012 | Mestha et al. ............... | 358/3.27 |

OTHER PUBLICATIONS

Carson, et al., "On the Performance of Iterative Demapping and Decoding Techniques Over Quasi-Static Fading Channels", 2007 IEEE 18th International Symposium on Personal, Indoor and Mobile Radio Communications, Jan. 1, 2007.

Cho, et al., "Analysis of Soft-Decision FEC on non-AWGN Channels", Optics Express, vol. 20, No. 7, Mar. 26, 2012.

(Continued)

*Primary Examiner* — Emmanuel Bayard
(74) *Attorney, Agent, or Firm* — Potomac Technology Law, LLC

(57) ABSTRACT

A system and methods that accommodate for nonlinear interference in a multi-carrier communications system are provided. A first signal is received by a receiver. The first signal comprises a source signal transmitted on a carrier over a communications channel. The first signal reflects a source symbol mapped to one of a plurality of signal constellation points, and each signal constellation point is associated with a different one of a plurality of signal clusters. A received representation of the source signal with respect to the source symbol is acquired from the first signal. A plurality of likelihood metrics are determined, where each likelihood metric is based on the received representation of the source signal with respect to the source symbol and a different one of a plurality of core parameters, wherein each core parameter is based on a centroid estimate with respect to a different one of the signal clusters.

58 Claims, 12 Drawing Sheets

(56) References Cited

OTHER PUBLICATIONS

EPO, "Extended European Search Report", EPO App. No. 13184878.0.

Vaishampayan, et al., "Joint Design of Block Source Codes and Modulation Signal Sets", IEEE Transactions on INformation Theory, vol. 38, No. 4, Jul. 1, 1992.

* cited by examiner

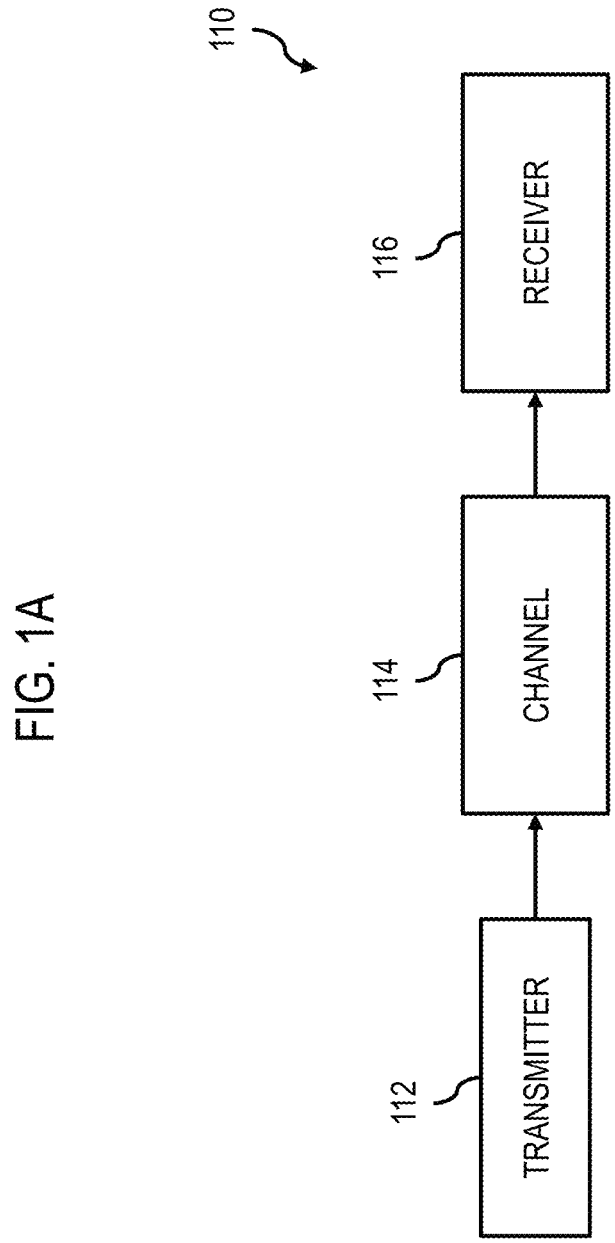

FORWARD ERROR CORRECTION DECODER INPUT COMPUTATION IN MULTI-CARRIER COMMUNICATIONS SYSTEM

BACKGROUND

The present invention is generally covers receivers in wireless communications systems, and more specifically is generally drawn to addressing noise and/or interference effects exhibited by received signals, where the signals were transmitted via a transmitter employing high power amplifiers (HPAs), such as satellite transponders in a satellite communications system. Satellite communication systems must transmit signals over vast distances from earth to satellites in orbit and vice-versa. A communication system may include a transmitter having an HPA or a transponder that includes a transmitter having an HPA. If a transmitter (or transmitter section of a transponder) is located in a space-based satellite, there is limited access thereto. Accordingly, compensating for the distortion associated with an HPA within a space-based satellite transmitter is much more complicated than compensating for the distortion associated with an HPA within a ground-based transmitter. Additionally, satellites in general have strict power consumption limits that require the communication systems to operate at very high efficiencies of both power use and usage of available communication bandwidth.

Due to physical limitations, there is a maximum number of HPA units that can fit in a transponder. Sharing multiple carriers by a single transponder HPA allows for transmitting more data and servicing more users without exceeding this physical limitation. Another benefit of this multicarrier operation is that it allows for reducing the transmission symbol rate per carrier without sacrificing system throughput. This greatly eases the burden on hardware implementation.

However, when multiple carriers are amplified by way of a single HPA, and when driven near its saturation creates a large amount of nonlinear interference. This interference manifests as a large mismatch between what the FEC decoder is expecting and what is received, causing a large degradation in performance.

In essence, many conventional satellite communication systems with HPAs are able to: drive the HPA in or near saturation while efficiently communicating over a single carrier; or inefficiently communicate over a plurality of carriers without driving the HPA in or near saturation. For example, one conventional system addresses the above using a statistical model at the decoder input to compensate for interference. However, such a system ignores the impact of nonlinear interference, resulting in a system that is unable to efficiently communicate over a plurality of carriers in or near saturation.

Other attempts to compensate for nonlinear interference have been complex and require receivers to exchange information. For instance, a conventional system compensates for linear and nonlinear intersymbol interference (ISI) and linear and nonlinear adjacent channel interference (ACI) due to the nonlinearlity of HPA and tight crowding of carriers in a transmitter HPA or transmitter section of a transponder HPA. However, such a system requires receivers to coordinate samples from adjacent carriers, resulting in increased system complexity and computational effort.

What is needed is a method of compensation that addresses nonlinear interference on the FEC decoding operation, particularly when multiple carriers share a single HPA that requires no exchange of information relating to adjacent carriers.

SOME EXEMPLARY EMBODIMENTS

The present invention advantageously addresses the needs above, as well as other needs, by providing a system and methods that accommodate for nonlinear interference in a multi-carrier communications system. According to exemplary embodiments of the present invention, adaptive single-carrier algorithms are provided for application in a communications terminal receiver in a wireless communications system. Such algorithms, for example, are applied to the signals received by the communications terminal, prior to being fed into the decoder of the terminal receiver. The algorithms generate improved likelihood metrics to better match the signal (as received) for the decoder process. The algorithms thereby address nonlinear interference introduced into the transmitted signal of a multi-carrier system, such as interference caused by the multiple carriers of the system being amplified for transmission via a single high power amplifier (HPA) driven at or near saturation. Further, the algorithms address the interference without requiring information regarding the other carriers simultaneously transmitted via the system, such as samples from the adjacent carriers. Moreover, the algorithms according to embodiments of the present invention are adaptable, whereby parameters used for the generation of the improved likelihood metrics can periodically be updated to address changing conditions of the communications system and the operating environment.

According to an exemplary embodiment, a method comprises receiving, by a receiver, a first signal. The first signal comprises a modulated source signal transmitted on a first carrier over a communications channel, wherein the modulated source signal reflects a first source symbol mapped to a one of a plurality of signal constellation points. Each signal constellation point is associated with a different one of a plurality of signal clusters, and each signal cluster reflects interference and/or noise effects with respect to the associated signal constellation point. A received representation of the modulated source signal with respect to the first source symbol is acquired from the received first signal. A plurality of first likelihood metrics are determined. Each first likelihood metric is based on the received representation of the modulated source signal with respect to the first source symbol and a different one of a plurality of core parameters, and each core parameter is based on a centroid estimate with respect to a different one of the signal clusters. Each first likelihood metric may be based further on a different one of a plurality of variance parameters, where each variance parameter is based on a variance estimate with respect to a different one of the signal clusters, and/or a different one of a plurality of correlation parameters, where each correlation parameter is based on a correlation estimate with respect to a different one of the signal clusters. Further, the one signal constellation point and the first source symbol may be determined based on one or more of the likelihood metrics. Alternatively, or in addition, one or more bit-level likelihood metrics may be determined based on one or more of the first likelihood metrics, and one or more code-bits associated with the one signal constellation point and the first source symbol may be determined based on one or more of the bit-level likelihood metrics.

According to a further exemplary embodiment, the method further comprises receiving, by the receiver, a training signal. The training signal comprises a modulated source training signal transmitted on the first carrier over the communications channel, where the modulated source training signal reflects a repeated transmission of each of a plurality of source symbols including the first source symbol. Each source symbol is linked with a different one of the signal constellation points and each repeated transmission of the source symbol is mapped to the linked constellation point. A received representation of the modulated source training signal with respect to each of the repeated transmissions of each of the source symbols is acquired from the received training signal. The signal clusters are determined, where each signal cluster comprises a plurality of signal points. Each signal point of the signal cluster reflects the received representation of the modulated source training signal with respect to a different one of the repeated transmissions of the source symbol that is linked with the signal constellation point associated with the signal cluster. The centroid estimate with respect to each signal cluster is determined based on a centroid or center of mass with respect to the signal points of the signal cluster. The variance estimate with respect to each signal cluster is determined based on variances with respect to the signal points of the signal cluster and the associated signal constellation point. The correlation estimate with respect to each signal cluster is determined based on cross-correlations with respect to the signal points of the signal cluster and the associated signal constellation point.

According to another exemplary embodiment, an apparatus comprises a receiver module configured to receive a first signal. The first signal comprises a modulated source signal transmitted on a first carrier over a communications channel, wherein the modulated source signal reflects a first source symbol mapped to a one of a plurality of signal constellation points. Each signal constellation point is associated with a different one of a plurality of signal clusters, and each signal cluster reflects interference and/or noise effects with respect to the associated signal constellation point. The apparatus further comprises a signal acquisition module configured to acquire, from the received first signal, a received representation of the modulated source signal with respect to the first source symbol. The apparatus further comprises a computation module configured to determine a plurality of first likelihood metrics. Each first likelihood metric is based on the received representation of the modulated source signal with respect to the first source symbol and a different one of a plurality of core parameters, and each core parameter is based on a centroid estimate with respect to a different one of the signal clusters. Each first likelihood metric may be based further on a different one of a plurality of variance parameters, where each variance parameter is based on a variance estimate with respect to a different one of the signal clusters, and/or a different one of a plurality of correlation parameters, where each correlation parameter is based on a correlation estimate with respect to a different one of the signal clusters. Further, the apparatus may comprise a determination module configured to determine the one signal constellation point and the first source symbol based on one or more of the first likelihood metrics. Alternatively, or in addition, the computation module may be further configured to determine one or more bit-level first likelihood metrics based on one or more of the first likelihood metrics, and the determination module may be further configured to determine one or more code-bits associated with the one signal constellation point and the first source symbol based on one or more of the bit-level first likelihood metrics.

According to a further exemplary embodiment, the receiver module is further configured to receive a training signal. The training signal comprises a modulated source training signal transmitted on the first carrier over the communications channel, where the modulated source training signal reflects a repeated transmission of each of a plurality of source symbols including the first source symbol. Each source symbol is linked with a different one of the signal constellation points and each repeated transmission of the source symbol is mapped to the linked constellation point. The signal acquisition module is further configured to acquire, from the received training signal, a received representation of the modulated source training signal with respect to each of the repeated transmissions of each of the source symbols. The computation module is further configured to determine the signal clusters, where each signal cluster comprises a plurality of signal points. Each signal point of the signal cluster reflects the received representation of the modulated source training signal with respect to a different one of the repeated transmissions of the source symbol that is linked with the signal constellation point associated with the signal cluster. The computation module is further configured to determine the centroid estimate with respect to each signal cluster based on a centroid or center of mass with respect to the signal points of the signal cluster. The computation module is further configured to determine the variance estimate with respect to each signal cluster based on variances with respect to the signal points of the signal cluster and the associated signal constellation point. The computation module is further configured to determine the correlation estimate with respect to each signal cluster based on cross-correlations with respect to the signal points of the signal cluster and the associated signal constellation point.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A and 1B illustrate communications systems capable of employing an interference compensation system and algorithms, in accordance with exemplary embodiments;

DETAILED DESCRIPTION

Figure 1B:
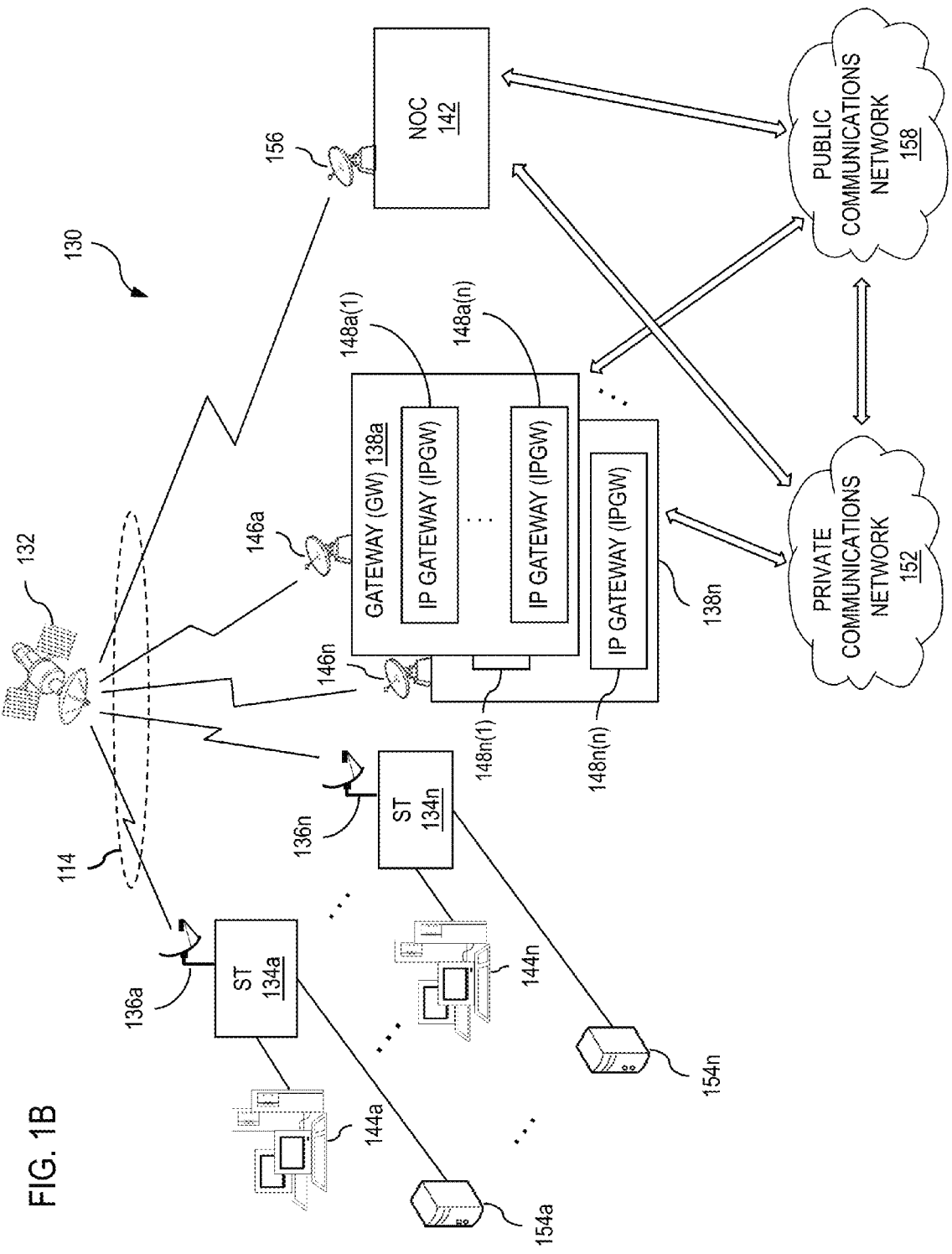

A system, apparatus, and methods for nonlinear interference compensation, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

FIG. 1A illustrates a block diagram of a communications system capable of employing an interference compensation system and algorithms, in accordance with exemplary embodiments. With reference to FIG. 1A, a broadband communications system 110 includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. Coding may be utilized to combat noise and other issues associated with the channel 114, such as forward error correction (FEC) codes.

FIG. 1B illustrates an exemplary satellite communications system 130 capable of supporting communications among terminals with varied capabilities, including an interference compensation system and algorithms, in accordance with exemplary embodiments. Satellite communications system 130 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 133. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one exemplary embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further exemplary embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a bent-pipe system of an exemplary embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

Figure 2:
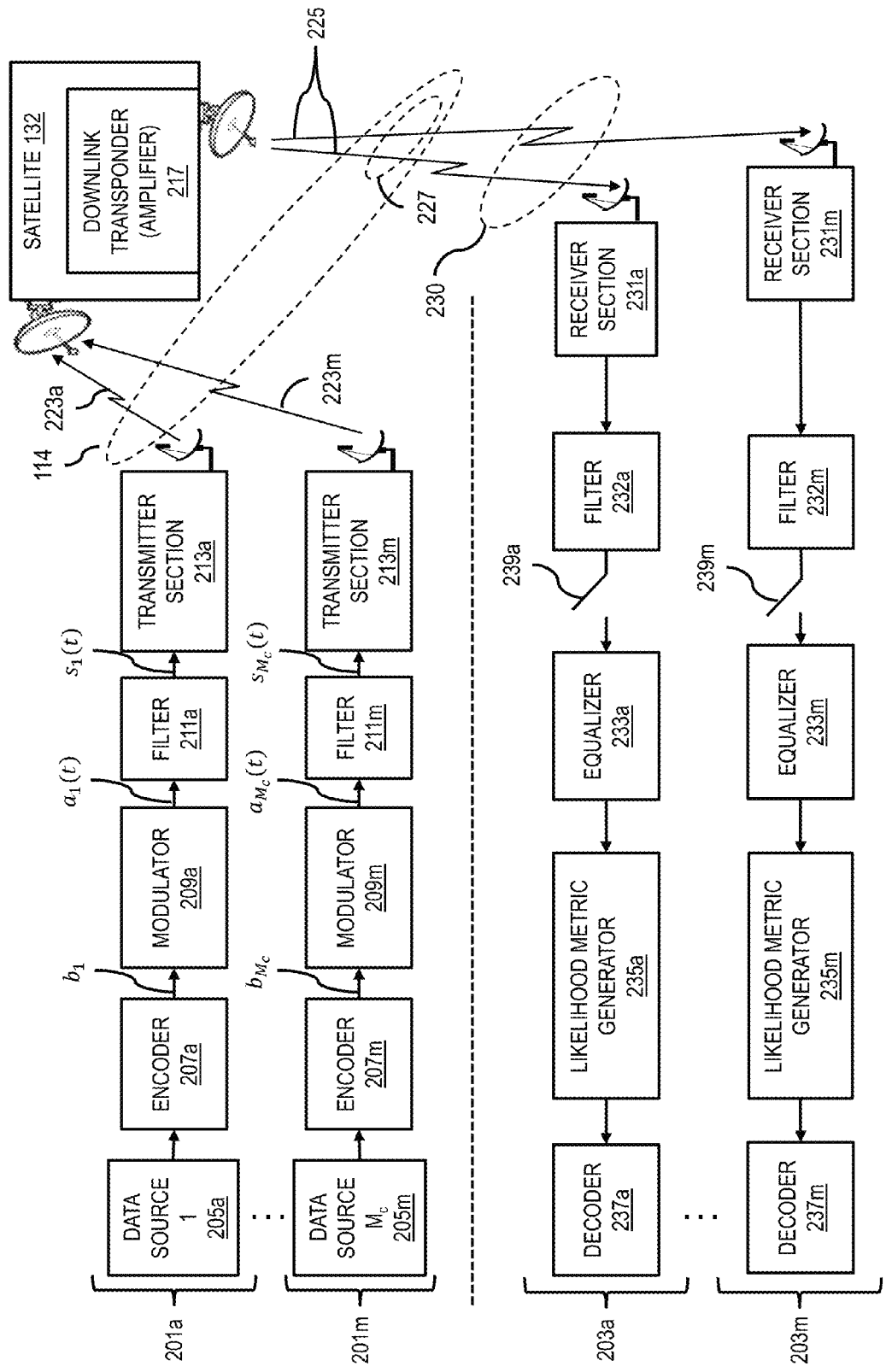
FIG. 2 illustrates a block diagram depicting an exemplary transmitter and receiver of the communications system of FIG. 1A, where the receiver employs an interference compensation system and algorithms, in accordance with exemplary embodiments.

FIG. 2 illustrates a block diagram depicting an exemplary transmitter and receiver of the communications system of FIG. 1A, where the receiver employs an interference compensation system and algorithms, in accordance with exemplary embodiments. While embodiments of the present invention are not limited to a satellite communications system, for the purpose of explanation, the following description envisions an embodiment encompassing the satellite communications system 130 of FIG. 1B. As illustrated in FIG. 2, the communication system includes transmitters 201 (201a-201m) and receivers 203 (203a-203m), with the signals being transmitted over the channel 114, via the transponder/amplifier 217, where the transponder/amplifier 217 comprises components of the transmission section of the satellite 132. The transmitters 201a-201m and receivers 203a-203m may represent a corresponding number of STs 134 and GWs 138. By way of example, a particular transmission 223a may reflect a transmission of data from a data source 205a (e.g., the host 144a), by the ST 134a, and destined for the GW 138a, where the receiver portion of the GW 138a may comprise the receiver 203a. A transmitter 201, in accordance with exemplary embodiments, generally comprises at least one data or signal source 205, an encoder section 207, a modulator section 209, a filter section 211 and a transmitter section 213 (e.g., an upconverter/amplifier section). A receiver 203, in accordance with exemplary embodiments, generally comprises a receiver section 231, a filter section 232, a sampler module 239, an equalizer section 233 (e.g., linear equalizers), a likelihood metric generator module 235, and a decoder section 237.

According to one exemplary embodiment the satellite system comprises a bent-pipe system, where the satellite acts as a repeater (as described above). The transponder of such a communications satellite comprises a series of interconnected components that for a communications channel between the satellite receive and transmit antennas. At the receive side, a typical transponder generally comprises an input band limiting device (e.g., a band pass filter), an input low-noise amplifier (LNA) (which amplifies the received signal to compensate for the significant weakening of the signal due to large distance traveled between the earth station transmitter and the satellite), and an input multiplexer (IMUX) (which generally comprises filter banks that channelize the receive band into the individual channels). At the transmit side, a typical transponder generally comprises a frequency translator (which converts the frequency of the received signal to the frequency required for the transmitted signal), an output band limiting device (e.g., a band pass filter), and a downlink high power amplifier (HPA) (which amplifies the signal for transmission back down to an earth station receiver). In one embodiment, due to the physical limitations of the number of HPAs that can fit in the downlink transmission section of the satellite 132, to maximize bandwidth efficiencies (e.g., to increase bandwidth and data throughput), multiple received uplink channels or carrier signals can be multiplexed onto a single wideband carrier of a single downlink transponder HPA 217 (a wideband multi-carrier system). In such a multicarrier system, the downlink transponder will also include a signal combiner section or output multiplexer (OMUX), which combines the uplink transponder channels or carrier signals that are switched for transmission to a common downlink cell 230. The OMUX thereby generates a combined transmission signal for transmission via the HPA for the particular transmit signal or downlink beam 225.

Accordingly, in such a multi-carrier system, the satellite aggregates multiple received uplink data signals (e.g., data signals destined for a particular geographic region serviced by a particular downlink beam of the satellite), where each uplink data signal is carried by a separate carrier. The satellite simultaneously transmits the aggregate data signal over the single downlink channel 227 to the single downlink cell 230, which is transmitted via a single downlink transponder HPA 217, on a single downlink signal 225. During transmission over the downlink channel 227, the transmitted downlink signal 225 will encounter various physical effects that manifest as noise experienced in the received signal. The added channel noise typically may be idealized as additive white Gaussian noise. Hence, the transmitted signal 225 reflects multiple source data signals 223a-223m, respectively carrying data generated by the different data sources 205a-205m. While a variable number of data signals may be transmitted over the satellite 132 via such a multi-carrier system, however, for purposes of simplification, the following description envisions an embodiment encompassing data signals from two signal sources 205a and 205m, respectively transmitted via the uplink transmission signals 223a and 223m, and combined via the satellite and transmitted back via the downlink transmission signal 225.

According to an exemplary embodiment, in operation, data or signal source 205a outputs a first source signal to encoder 207a, where the first source signal reflects a sequence of source data symbols for transmission over the communications system. Encoder 207a generates an encoded vector signal $b_1$ from the first source signal. In one embodiment, encoder 207a is an error correction encoder that adds information to reduce information loss at the receive section 203. Additionally, or alternatively, the encoder 207a interleaves data from the first source signal into the encoded vector signal. Modulator 209a receives the encoded vector signal and generates a modulated discrete signal $a_1(t)$, where each source symbol is mapped to a respective signal constellation point of the signal constellation of the applied modulation scheme. In one embodiment, modulators 209 are Gray-coded Quadrature Amplitude Modulation (QAM) modulators or Amplitude and Phase Shift Keyed (APSK) modulators (e.g., 8 APSK, 16 APSK or 32 APSK modulators). Accordingly, depending on the applied modulation scheme, each source symbol represents a number of source data bits, where (via the applied modulation) each source symbol is mapped to an associated signal constellation point and transmitted to the satellite via a common uplink transmission carrier. For example, with 16 APSK modulation, each of the 16 constellation points represents or corresponds to an arrangement of four source data bits (e.g., 0000, 0001, 0010, ... 1111), and (via the applied modulation) each received data symbol is mapped to its corresponding or associated constellation point. In one embodiment, the discrete signal output of the modulator 209 (e.g., the modulated signal) may be represented as:

$$a_m(t) = \sum_{k=-\infty}^{\infty} a_{m,k} \delta(t - kT_s - \varepsilon_m T_s),$$

where $\{a_{m,k}; m=1, \ldots, M_c\}$ are sets of complex valued data symbols, $\delta(t)$ is the Dirac delta function, and $\varepsilon_m$ represents the normalized difference in signal arrival times.

Filter 211a receives the modulated discrete signal $a_1(t)$ and generates a continuous filtered signal $s_1(t)$ reflecting the data of the modulated discrete signal. In one embodiment, filter 211a is a pulse shaping filter with impulse responses $P_{m,T}(\tau)$ to generate the signal $s_m(t)$ as:

$$s_m(t) = \int_{-\infty}^{\infty} a_m(t-\tau) P_{m,T}(\tau) d\tau$$

According to one embodiment, the filter $P_{m,T}(\tau)$ may model the cascade of pulse-shaping filters and the on-board input multiplexing filter of the satellite 132. Among other functions, the transmitter section 213a transfers the continuous filtered signal $s_1(t)$ onto an associated carrier to generate a first continuous carrier signal for transmission over the uplink channel 223a to the satellite 132. By way of example, to generate the first continuous carrier signal, the transmitter section 213a my mix the continuous filtered signal from the filter 211a with a local oscillator signal to generate the desired carrier signal, where the oscillator signal may be represented as $\exp(j(2\pi f_1 t+\theta_1))/\sqrt{M_c}$, where $f_1$ and $\theta_1$ represent the center frequency and carrier phase of the first carrier signal. Additional continuous carrier signals, for transmitting the data source signals (e.g., from data sources 205b-205m), may be generated using similar processes, where each additional continuous carrier signal would be of a different center frequency and carrier phase ($f_m$ and $\theta_m$).

As described above, in a multi-carrier system, the satellite 132 may combine various different received carrier signals, destined for a common downlink cell, for transmission to that cell via a single downlink channel (e.g., downlink channel 227). Accordingly, within the satellite 132, a signal combiner section (not shown) combines the received continuous carrier signals 223a and 223m for transmission as composite signal 225 via the downlink channel 227. As will be understood, the composite signal 225 may further include a number of other carrier signals destined for the downlink cell serviced by the downlink channel 227. Accordingly, in one embodiment, the combined composite signal may be represented in complex form as:

$$s_c(t) = \sum_{m=1}^{M_c} s_m(t) \frac{\exp(j(2\pi f_m t + \theta_m))}{\sqrt{M_c}},$$

where $f_m$ and $\theta_m$ are the center frequency and carrier phase of the mth uplink channel, respectively.

Further, within the transmit section of the satellite 132, the downlink transponder 217 amplifies the combined continuous composite signal (e.g., via an HPA) to generate the downlink transmission signal 225, which is transmitted to the respective downlink cell 230. In one embodiment, to achieve a maximum efficiency of the downlink transponder 217 (e.g., to achieve a maximum output power without overly distorting the amplified signal, and thereby achieve power and bandwidth or data throughput efficiencies), the HPA is driven near or to its saturation level, while the back-off is minimized. The HPA thereby operates in the nonlinear region of its output range, and, in view of the multiple uplink signals being transmitted simultaneously, the uplink signal carriers interact with or affect each other in a nonlinear fashion. Additionally, to achieve further efficiency, the system may be designed such that a single downlink HPA 217 may be transmitting signals of differing rates, employing multiple rate constellations (e.g., 16 APSK, 32 APSK, etc.). Accordingly, all these factors combined introduce a significant level of distortion (e.g., nonlinear interference) in the transmitted signal 225.

The receivers 203 located within the downlink cell 230, that is serviced by the downlink beam or channel 227, all receive the same transmit signal 225. Each receiver thus must first demultiplex and filter the received signal to determine or extract for further processing only the carrier of the source signal or uplink channel that is directed to the particular terminal. In a further embodiment, in the case of a multi-channel receiver, as would be recognized, the receiver may determine and process multiple carrier frequency signals of multiple uplink channels directed to the particular terminal. For simplicity, however, the following description addresses exemplary embodiments encompassing a single-channel receiver. Accordingly, for example, the receiver 203a will first process the received transmission signal 225 to isolate the carrier phase and frequency of the uplink signal 223a. In that regard, the receiver 203a includes the receiver section 231a. In one embodiment, the receiver section may comprise a bank of receiver mixers to frequency/phase-translate each carrier of the received signal 225, where the translation may be expressed as $\sqrt{M_c}\exp(-j(2\pi f_1 t+\theta_1))$ for the signal 223a, and generally as $\sqrt{M_c}\exp(-j(2\pi f_m t+\theta_m))$ for the $m^{th}$ signal 223. The signal then passes through the receive filter bank 232a, and through the processing of the receiver section 231a and the filter bank 232a, the receiver 203a extracts the carrier signal 223a, effectively tuning to the carrier frequency and phase of the uplink signal directed to the particular receiver. In one embodiment, the input-output relationship of the receive filter bank 232 of the $m^{th}$ receiver 201 may be expressed as:

$$x_m(t)=\int_{-\infty}^{\infty} r(t-\tau)\sqrt{M_c}\exp(-j(2\pi f_m t+\theta_m))P_{m,R}(\tau)d\tau,$$

where m=1, ... $M_c$.

More generally, the filter bank 232a (e.g., $p_{m,R}(t)$) models the cascade of the matched filter and the on-board output multiplexing (OMUX) filter of the satellite transponder. The outputs of the receive filter bank are then sampled at the symbol rate of the data source 205a to produce the sampled signal $x_m((n+\epsilon_m)T_s)$. For example, because the extracted version of the received carrier signal 223a reflects a sequence of source symbols, each mapped to a corresponding or respective constellation point, the signal is sampled in synchronization with the sample rate of the source symbols as transmitted/received to obtain a received form or representation of each of the respective transmitted signal constellation points.

Next, an optional linear equalizer 233a performs linear compensation to equalize the impact of IMUX and OMUX filters of the satellite transponder. In a traditional FEC-coded system, the linear equalizer outputs (e.g., $y_m((n+\epsilon_m)T_s)$) are used to generate log-likelihood ratios, which are passed to the decoder 237a. The decoder utilizes the log-likelihood ratios for a determination of the respective transmitted signal constellation points, and from there determines the corresponding source symbol and code-bits based on the received signal. Considering the signal distortion factors discussed above, however, the non-linear interference effects with respect to the HPA cannot be effectively offset or compensated for, even with the application of the equalizer 233. In order to address this distortion, exemplary embodiments of the present invention provide for an improved system and algorithms for generating improved likelihood metrics, which accommodate for the distortion exhibited by the received signals. Specifically, according to exemplary embodiments, the receiver 203 includes a likelihood metric generator 235, which generates improved likelihood metrics (as described in further detail with respect to FIGS. 4 and 5), which better match the distortion exhibited by the received signals and thereby facilitate improved performance of the decoder 237. The improved likelihood metrics are used to generate improved log-likelihood ratios to be passed to the decoder 237 for the determination of the code-bits of the respective transmitted source data symbol. Moreover, the system and algorithms of exemplary embodiments provide for such improved likelihood metric computations without requiring any modifications to a traditional decoder. Accordingly, the output of the equalizer 233a is passed to the likelihood metric generator 235a, which generates the improved likelihood metrics based on the received signals. The improved likelihood metrics are used to generate improved log-likelihood ratios, which are then passed to the decoder 237a, which determines the transmitted code-bits based on the log-likelihood ratios (based on the improved likelihood metrics). The decoder 237a decodes data relating to data sources 205a from the received signal 225 using the improved likelihood ratios, resulting in a reduced impact of nonlinear interference, which thus enables the amplifier 217 to be further driven into saturation. Additionally, the decoder 237a may deinterleave data from the received signal 225. Further, additional uplink data signals (e.g., other uplink signals 223), reflecting data from respective other data sources 205, may be received via the transmitted signal 225, and processed by respective receivers 203 in a similar fashion as described above with respect to the receiver 203a.

Figure 3:
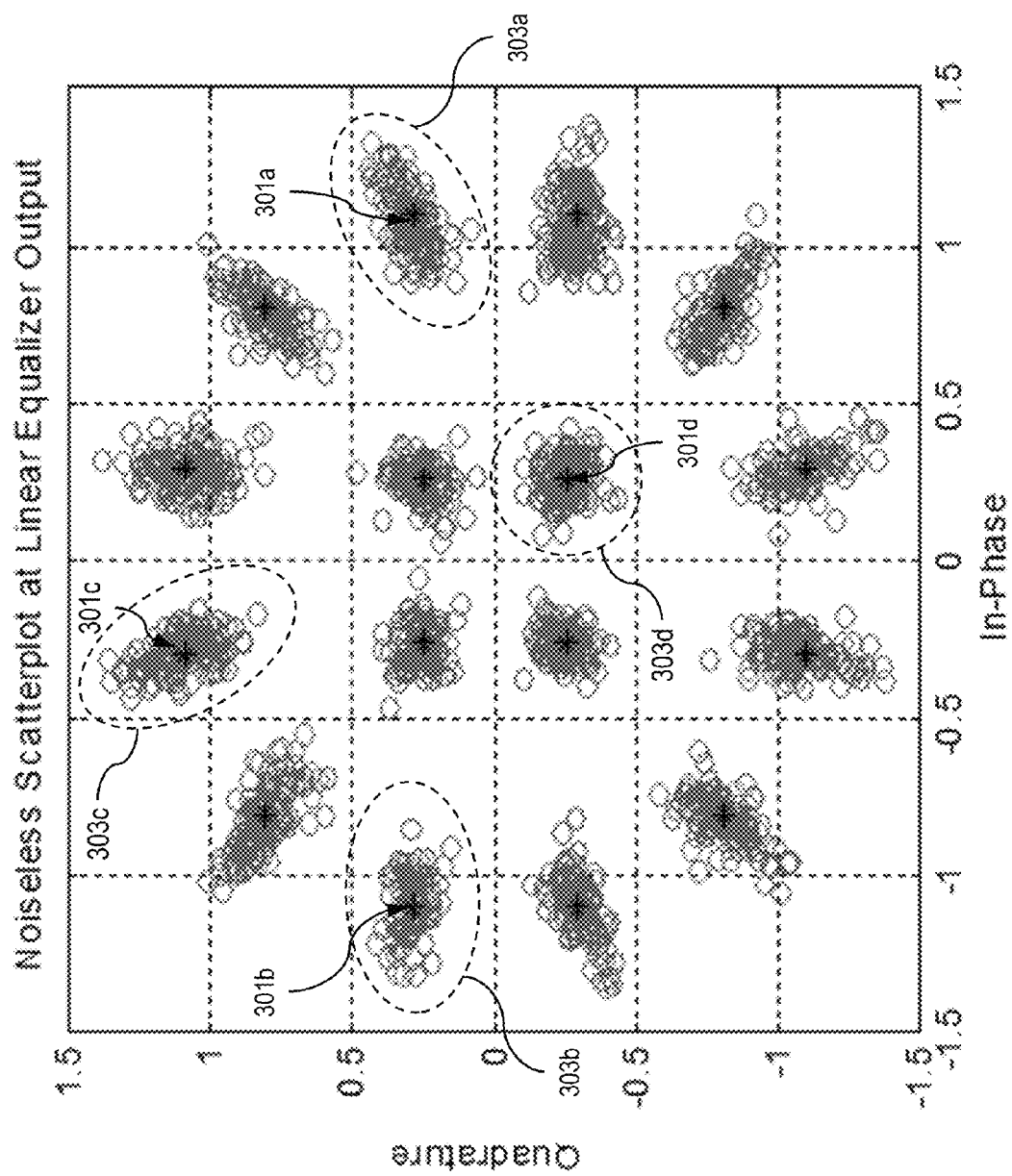
FIG. 3 illustrates an example scatter plot of the received signals at the output of the equalizer of a receiver, reflecting a simulation of the transmission multiple sample symbols mapped to each of the constellation points of a 16 APSK signal constellation.

FIG. 3 illustrates an example scatter plot of the received signals at the output of the equalizer of a receiver, reflecting a simulation of the transmission multiple sample symbols mapped to each of the constellation points of a 16 APSK signal constellation. As previously discussed, a single HPA amplifying multiple carriers being driven near or at its saturation level creates a large amount of nonlinear interference or signal distortion. As illustrated by the scatter plot simulation of FIG. 3, due to interference, each of the simulated sample symbol transmissions for a particular constellation point is received as a point within the general vicinity of the nominal constellation point, and (as received) all the simulated sample symbol transmissions for a particular constellation point are reflected as a cluster of points around the respective nominal signal constellation point. Accordingly, each signal constellation point is associated with a respective signal cluster reflecting the interference effects on a plurality of sample symbol transmissions over the communications system. For example, the simulated sample symbol transmissions, which were mapped to the nominal signal constellation point 301a, were received as the cluster of circles within the dashed outline 303a. Similarly, the simulated sample symbol transmissions, which were mapped to the nominal signal constellation point 301b, were received as the cluster of circles within the dashed outline 303b. Moreover, as is apparent from the scatter plot of FIG. 3, the interference effects the clustering of the received signals in a different fashion from one signal constellation point to another, where the clustering around each of the nominal points of the inner ring of the signal constellation is scattered in a relatively circular pattern, and the clustering around each of the nominal points of the outer ring of the signal constellation is scattered in more of an elliptical or oblong pattern. See, for example, the clustering 303c around the outer constellation point 301c, as compared to the clustering 303d around the inner circle constellation point 301d. Traditional means employed to compensate for such interference, however, treat the interference effects or distortion of each received signal in an identical fashion, irrespective of the particular constellation point with which the received signal is associated. For example, traditional compensation methods typically compensate for the distortion in a constant fashion, treating the interference a simple White Gaussian noise, which would be manifested as circular clustering in all cases (for all constellation signal points). By contrast, the system and algorithms of exemplary embodiments of the present invention provide for improved likelihood metric calculations, which, for example, accommodate for the elliptical shape of the clusters, and the differing degrees of warping or rotation of the clusters with respect to the different constellation points.

Figure 4:
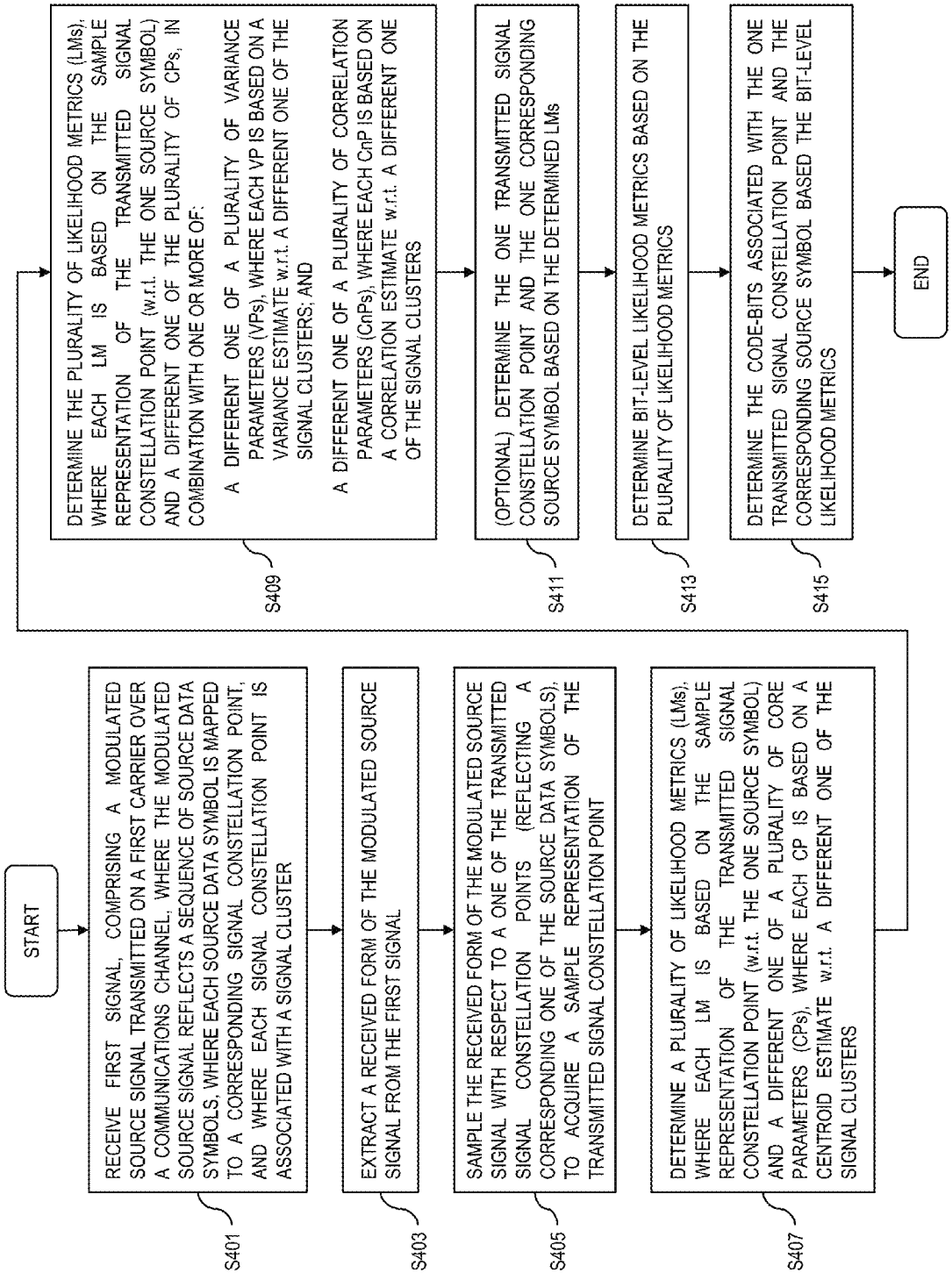
FIG. 4 illustrates a flow chart depicting a method for employing an interference compensation system and algorithms, in accordance with exemplary embodiments.

FIG. 4 illustrates a flow chart depicting a method for employing an interference compensation system and algorithms, in accordance with exemplary embodiments. Initially, the signal transmitted by the satellite is received by the receivers within the downlink cell serviced by the transmitted signal, such as the signal 225 transmitted by the satellite 132 and received by the receiver section 231a of the receiver 203a (S401). As discussed above with respect to the transmitter 201a, for example, the signal 225 reflects a sequence of source data symbols from the data source 205a, where each source symbol has been encoded by the encoder 207a, and mapped by the modulator 209a to a signal constellation point corresponding to the particular source symbol, to form the modulated source signal. The modulated source signal in turn has been transmitted to the satellite 132 by the transmitter section 213a via a respective uplink carrier signal. Further, in a multi-carrier system, the transmitted signal 225 may also reflect one or more sequences of source data symbols, each transmitted to the satellite 132 by a respective other transmitter 201 on a respective other carrier signal 223.

Then, as described above with respect to the receiver, the receiver first processes the received transmission signal 225 to isolate the carrier phase and frequency of the uplink signal corresponding to (destined for) the receiver (S403). For example, the receiver 223a extracts a received representation of the uplink signal 223a from the received signal 225, effectively tuning to the carrier frequency and phase of the uplink signal directed to the particular receiver. The receiver (e.g., receiver 203a) then samples the extracted version of the carrier signal or modulated source signal (in synchronization with the source symbol rate, as transmitted) to generate sample representations of the transmitted signal constellation points (the transmitted modulated source signal), which reflect the encoded and modulated respective source data symbols. For example, at a given point in time, the receiver samples the extracted version of the carrier signal 223a, and thereby obtains a received form or sample representation of a one of the received signal constellation point transmissions, which reflects a corresponding one of the source data symbols, (as encoded and modulated, and originating from the data source 205a) (S405). At this point, as discussed above, an optional linear equalizer may be employed to compensate for certain noise effects associated with associated satellite components.

Subsequently, in accordance one exemplary embodiment, the likelihood metric generator 235 determines improved likelihood metrics to be used in determining the actual transmitted signal constellation points and the respective source symbols and code-bits, based on the received representations thereof. With respect to the receiver 203a, for example, the likelihood metric generator 235a determines a plurality of likelihood metrics (LMs), where each LM is based on the sample representation with respect to the one signal constellation point (with respect to the one corresponding source data symbol), and a different one of a plurality of core parameters (CPs), where each CP is based on a centroid estimate with respect to a different one of the signal clusters (S407). More specifically, to generate the plurality of LMs, the likelihood metric generator first determines an LM based on the sample representation with respect to the one signal constellation point and a first CP, where the first CP is based on a centroid estimate for a first of the signal clusters. The likelihood metric generator then determines another LM based on the sample representation with respect to the one signal constellation point and a second CP, where the second CP is based on a centroid estimate for a second of the signal clusters. The likelihood metric generator continues in that fashion, determining an LM based on the sample representation with respect to the one signal constellation point and a different one of the plurality of CPs, where each of the CPs is based on a centroid estimate for a one of the signal clusters. For example, with a 16 APSK signal constellation, each signal constellation point will be associated with a signal cluster, and the likelihood metric generator will determine 16 LMs (each one based on the sample representation with respect to the one signal constellation point and a different one of the CPs).

In accordance with a further exemplary embodiment, the likelihood metric generator 235a determines the plurality of likelihood metric values (LMs), where each LM is based on the sample representation with respect to the one signal constellation point (with respect to the one corresponding source data symbol), and a different one of the plurality of CPs, in combination with a different one of a plurality of variance parameters (VPs), where each VP is based on a variance estimate with respect to a different one of the signal clusters (S409). More specifically, to generate the plurality of LMs, the likelihood metric generator first determines an LM based on the sample representation with respect to the one signal constellation point and a first CP and VP, where the first CP and VP are based respectively on a centroid estimate and a variance estimate for a first of the signal clusters. The likelihood metric generator then determines another LM based on the sample representation with respect to the one signal constellation point and a second CP and VP, where the second CP and VP are based respectively on a centroid estimate and a variance estimate for a second of the signal clusters. The likelihood metric generator continues in that fashion, determining an LM based on the sample representation with respect to the one signal constellation point and a different one of the plurality of CPs and VPs, where each pair of an associated CP and VP is based respectively on a centroid estimate and a variance estimate for a one of the signal clusters. For example, with a 16 APSK signal constellation, each signal constellation point will be associated with a signal cluster, and the likelihood metric generator will determine 16 LMs (each one based on the sample representation with respect to the one signal constellation point and a different pair of an associated CP and VP, based on a common signal cluster).

Similarly, in accordance with a further exemplary embodiment, the likelihood metric generator 235a determines the plurality of likelihood metric values (LMs), where each LM is based on the sample representation with respect to the one signal constellation point (with respect to the one corresponding source data symbol), and a different one of the plurality of CPs, in combination with a different one of a plurality of correlation parameters (CnPs), where each CnP is based on a correlation estimate with respect to a different one of the signal clusters (S409). More specifically, to generate the plurality of LMs, the likelihood metric generator first determines an LM based on the sample representation with respect to the one signal constellation point and a first CP and CnP, where the first CP and CnP are based respectively on a centroid estimate and a correlation estimate for a first of the signal clusters. The likelihood metric generator then determines another LM based on the sample representation with respect to the one signal constellation point and a second CP and CnP, where the second CP and CnP are based respectively on a centroid estimate and a correlation estimate for a second of the signal clusters. The likelihood metric generator continues in that fashion, determining an LM based on the sample representation with respect to the one signal constellation point and a different one of the plurality of CPs and CnPs, where each pair of an associated CP and CnP is based respectively on a centroid estimate and a correlation estimate for a one of the signal clusters. For example, with a 16 APSK signal constellation, each signal constellation point will be associated with a signal cluster, and the likelihood metric generator will determine 16 LMs (each one based on the sample representation with respect to the one signal constellation point and a different pair of an associated CP and CnP, based on a common signal cluster).

Moreover, in accordance with yet a further exemplary embodiment, the likelihood metric generator 235a determines the plurality of likelihood metric values (LMs), where each LM is based on the sample representation with respect to the one signal constellation point (with respect to the one corresponding source data symbol), and a different one of the plurality of CPs, in combination with a different one of the plurality of VPs and a different one of the plurality of CnPs (S409). Accordingly, the likelihood metric generator determines an LM based on the sample representation with respect to the one signal constellation point and a different one of the plurality of CPs, VPs and CnPs, where each set of an associated CP, VP and CnP is based respectively on a centroid estimate, a variance estimate and a correlation estimate for a one of the signal clusters. For example, with a 16 APSK signal constellation, each signal constellation point will be associated with a signal cluster, and the likelihood metric generator will determine 16 LMs (each one based on the sample representation with respect to the one signal constellation point and a different set of an associated CP, VP and CnPs, based on a common signal cluster).

Once determined, the likelihood metric generator 235a then utilizes the determined likelihood metrics (LMs) to generate associated improved bit-level log-likelihood ratios for the determination of the code-bits corresponding to the transmitted signal constellation point (reflecting the respective corresponding source data symbol) (S413). For example, the foregoing likelihood metrics are determined on a constellation point/symbol level. Whereas, a decoder (e.g., the decoder 237, such as an FEC decoder), however, operates on a code-bit level. Accordingly, based on the determined likelihood metrics, the likelihood metric generator determines the associated improved log-likelihood ratios for use by the decoder in determining the code-bits associated with the transmitted signal constellation point. The likelihood metric generator then passes the determined log-likelihood ratios to the decoder 237a. The decoder then (as with a traditional FEC decoder in such a system) utilizes the improved log-likelihood ratios to determine the code-bits associated with the transmitted one signal constellation point and the respective one source symbol (based on the improved likelihood metric values) (S415). As such, the likelihood metric generator 235 generates improved likelihood metrics (as described in further detail with respect to FIGS. 4 and 5), which better match the distortion exhibited by the received signals and thereby facilitate improved performance of the decoder 237.

Further, the system and receivers 203 (e.g., the receiver 203a) may perform the same process (as described above with respect to the one transmitted constellation point reflecting the corresponding one of the source data symbols) with respect to further constellation points (reflecting subsequent source data symbols) transmitted on the same carrier subsequent to the one source data symbol. In that regard, for example, the receiver 203a (at a subsequent point in time in synchronization with the source data symbol rate) samples the extracted version of the carrier signal 223a, and thereby obtains a received form or representation of a one subsequent transmitted constellation point, which reflects a corresponding one subsequent source data symbol (as encoded and modulated, and also originating from the data source 205a). As with the prior sample representation with respect to the one received signal constellation point, the likelihood metric generator 235a generates a plurality of LMs, but this time based on the sample representation with respect to the one subsequent received signal constellation point (reflecting the one corresponding source data symbol). Based on the LMs, the likelihood metric generator determines the associated improved log-likelihood ratios, and the decoder 237a then determines the code-bits associated with the transmitted one subsequent signal constellation point and the respective one subsequent source data symbol. The process then continues for further constellation points (reflecting further source data symbols), as the receiver reconstructs the original discrete data sequence generated by the data source 205a, from the received downlink transmission signal 225, which reflects a received form of the source data signals as transmitted over the communications system 110 or 130 via the uplink carrier signal 223a.

According to a further exemplary embodiment, the receiver 203 (e.g., the receiver 203a) may make constellation point/symbol-level determinations based on the LMs or conditional PDFs. In a system without an FEC decoder, for example, the receiver 203a may determine the one transmitted signal constellation point and the one corresponding source symbol based on the determined conditional PDFs. Further, in a system with an FEC decoder, the receiver 203a may make such constellation point/symbol-level determinations based on the LMs or conditional PDFs, in addition to the bit-level determinations made by the decoder based on the bit-level likelihood metrics.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various exemplary embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. For example, according to different configurations of the receiver 203, the sample-level and bit-level determinations may be made by either the likelihood metric generator 235 or the decoder 237, or a combination thereof. Further, according to different configurations of the receiver 203, the various computations regarding the conditional PDFs or likelihood metrics and the bit-level likelihood metrics may be performed by the likelihood metric generator 235 or by other components or modules, or by a combination thereof.

In accordance with exemplary embodiments, the core parameters, variance parameters and correlation parameters may be pre-determined during a training mode, based on a series of training signals, and may be reconfigured or updated periodically, for example, as characteristics of the communications system or the system environment change. Further details regarding the determinations of the core parameters, variance parameters and correlation parameters, and the respective likelihood metrics, are discussed below.

Figure 5:
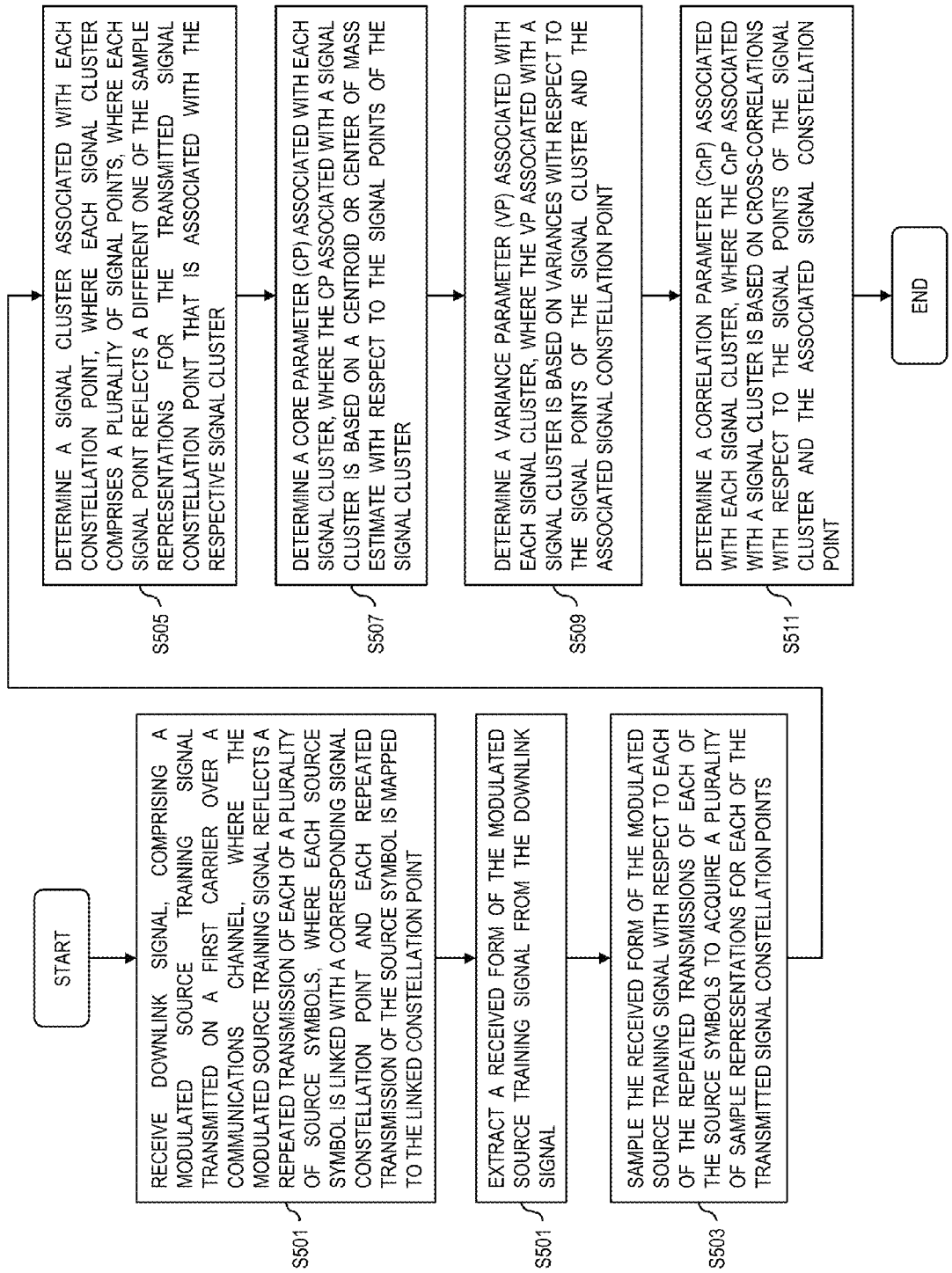
FIG. 5 illustrates a flow depicting a method of a training mode for determining core parameters, variance parameters and correlation parameters, for an interference compensation system and algorithms, in accordance with exemplary embodiments.

FIG. 5 illustrates a flow depicting a method of a training mode for determining core parameters, variance parameters and correlation parameters, for an interference compensation system and algorithms, in accordance with exemplary embodiments. According to an exemplary embodiment, in a training mode of the system, the transmitter 201a first generates a training signal, where the training signal reflects a repeated transmission of each of a plurality of source training symbols. The plurality of source training symbols comprise the source data symbols that reflect the various combinations of source data bits that are represented based on the applied modulation scheme. As discussed above, depending on the applied modulation scheme, each source symbol represents a number of source data bits, where (via the applied modulation) each source symbol is mapped to an associated signal constellation point. For example, with 16 APSK modulation, each of the 16 constellation points represents or corresponds to an arrangement of four source data bits (e.g., 0000, 0001, 0010, . . . 1111), and (via the applied modulation) each received data symbol is mapped to its corresponding or associated constellation point. Hence, each source symbol is linked with a corresponding signal constellation point, and (via the modulation scheme) each repeated instance of the same source symbol is mapped to the same linked constellation point. Accordingly, the training signal comprises a sequence of repeated discrete instances of each of the source data symbols. The training signal is encoded by the encoder 207a (in the same manner as the source data signals are encoded in the normal operational mode of the communications system), and then the modulator 209a maps each repeated transmission of a particular source data symbol to the corresponding signal constellation point. The modulated training signal is then filtered, upconverted and amplified in the normal operational manner, and transmitted by the transmission section to the satellite 132, via the transmission or carrier signal 223a.

The satellite in turn transmits the training signal down to the appropriate downlink cell (e.g., downlink cell 230), via the downlink transmission signal 225. Further, as discussed above, in a multicarrier system, the downlink transmission signal 225 may also include source data signals transmitted to the satellite from one or more other transmitters 201, which are destined for the same downlink cell 230, via respective other uplink carriers 223. Accordingly, the transmitted signal 225 (containing the carrier 223a, which is transporting the training signal) is affected by noise and interference, in the relatively same manner as are the normal data symbol transmissions during the normal operational mode of the communications system. Further, as discussed above, in a multicarrier system, the transmitted signal 225 may also reflect one or more sequences of source data symbols, each transmitted to the satellite 132 by a respective other transmitter 201 on a respective other carrier signal 223. With the system according to exemplary embodiments of the present invention, however, the training mode for a particular receiver 203 (e.g., the receiver 203a) operates irrespective of the particular signals being simultaneously transmitted via the downlink transmission signal 225. For example, during the training mode operation of the receiver 203a, other transmitters 201 may be operating in normal communications modes and transmitting operational data signals, or may also be operating in a training mode and transmitting other training signals to other respective receivers 203 (or a combination thereof). In any event, the training mode of a particular receiver 203, operates with respect actual operational communications of the system and other transmitters and receivers, and thereby generates the improved likelihood metrics based on genuine noise and interference effects of the system.

The receivers 203 that are located within the downlink cell 230 (e.g., receiver 203a) receive the transmitted signal 225, and (as also discussed above) the receiver 203a acquires (or tunes into) the transmitted carrier signal 223a (which contains the training signal) from the received signal 225. Hence, the receiver 203a receives the transmitted training signal, which comprises a modulated source signal transmitted over the communications channel 223a, where the modulated source signal reflects the repeated transmission of each of the plurality of source symbols, where each source symbol is linked with a corresponding signal constellation point and each repeated transmission of the source symbol is mapped to the linked constellation point (S501). Moreover, the receiver 203a is preprogrammed with knowledge of the transmission sequence of the source training symbols and the associated signal constellation points. The receiver 203a then extracts, from the acquired carrier signal (the training signal), a received form of the modulated source signal with respect to each of the repeated transmissions of each of the source training symbols (S503). In other words, via the sampler 239a, the receiver sequentially samples the received version of the carrier signal (the modulated training signal), in synchronization with the source symbol rate (as transmitted/received), to acquire a received form or sample representation of each of the respective transmitted signal constellation points (which reflect the repeated transmissions of the corresponding source training symbols).

The likelihood metric generator 235a then determines a signal cluster associated with each constellation point (S505). Each signal cluster comprises a plurality of signal points, where each signal point reflects the received form of the modulated source signal with respect to a different one of the repeated transmissions of the source training symbol that is linked with the signal constellation point associated with the signal cluster. That is to say, a signal cluster associated with a particular signal constellation point comprises a representation for each of the sampled signal constellation points (as received) for the respective repeated transmissions of the source training symbol that is linked to the particular signal constellation point. A signal cluster of sampled representations of the received repeated transmissions of a source data symbol or respective signal constellation point is thereby generated for each of the signal constellation points, where the sample points of each signal cluster reflect the received repeated transmissions of the respective signal constellation point (or linked source training symbol), as affected by the noise and interference associated with the transmission via the satellite 132. In other words, each signal cluster reflects an actual representative sampling of the noise and interference effects of the transmission system with respect to the associated signal constellation point.

Next, based on the sampled points of the signal cluster for each of the respective signal constellation points, the likelihood metric generator 235a determines the core parameter, the variance parameter and the correlation parameter associated with each signal cluster. In view of the preprogrammed knowledge of the transmission sequence of the training symbols and the associated signal constellation points, for each of the sampled points of a given signal cluster, the likelihood metric generator knows the nominal signal constellation point that was initially transmitted, and is thus able to calculate the core, variance and correlation parameters for the cluster and the nominal signal constellation point. Specifically, the likelihood metric generator determines the core parameter (CP) associated with each signal cluster, where the CP associated with a signal cluster is based on a centroid or center of mass estimate with respect to the signal points of the signal cluster (S507). Further, the likelihood metric generator determines the variance parameter (VP) associated with each signal cluster, where the VP associated with a signal cluster is based on variances with respect to the signal points of the signal cluster and the associated signal constellation point (S509). Also, the likelihood metric generator determines the correlation parameter (CnP) associated with each signal cluster, where the CnP associated with a signal cluster is based on cross-correlations with respect to the signal points of the signal cluster and the associated signal constellation point (S511). Accordingly, because the parameters are generated based on the signal clusters (reflecting actual noise and interference effects), the parameters thereby reflect an accurate representation of the noise and interference effects, which facilitates the generation of the improved likelihood metrics of exemplary embodiments of the present invention.

Moreover, in view of the accuracy in the representation of the noise and interference effects, and the associated robustness of the system employing exemplary embodiments of the present invention, even with a single-carrier receiver, the receiver 203 does not require any information characterizing the other signals and signal carriers simultaneously transmitted over a multi-carrier system. For example, in a traditional receiver, to compensate for the noise and/or interference effects exhibited by the received signal (e.g., in the case of an interference cancellation method), the receiver must possess information characterizing the other signals in order to subtract our or cancel the noise and interference. By contrast, in accordance with exemplary embodiments of the present invention, even in a single-carrier receiver, the receiver can accurately match or represent the noise and/or interference effects based on the likelihood metrics and core, variance and correlation parameters, and thereby address or accommodate for the noise and/or interference effects without possession of information characterizing the other signals. For example, the other signals simultaneously transmitted over the multi-carrier system (via the other carrier signals) may have been modulated based on 8, 16 or 32 APSK algorithms (or another modulation schemes), whereas the receiver need not possess any information regarding the specific modulation scheme of any of the other signals (as further illustrated below with reference to FIG. 6C).

According to an exemplary embodiment, the likelihood metric generator 235a determines the core parameters for each of the signal clusters (e.g., the estimated centroid or center of mass determination) by computing the real and imaginary centroids for the cluster (S507). For example, during the training mode, the output of the equalizer 233a corresponding to the $k^{th}$ signal cluster may be represented as:

$$y_{n,train}^{k} = y_m(((n+\epsilon_m)T_s);$$

where k=1, 2, ... M

The determination of the real and imaginary centroids with respect to the $k^{th}$ signal cluster ($c_k = c_{k,real} + jc_{k,imag}$) may then be represented as:

$$c_{k,real} = \frac{1}{N_{train}} \sum_n \text{real}\{y_{n,train}^k\}; \text{ where } n = 0, 1, 2, \ldots N_{train} - 1$$

$$c_{k,imag} = \frac{1}{N_{train}} \sum_n \text{imag}\{y_{n,train}^k\}; \text{ where } n = 0, 1, 2, \ldots N_{train} - 1$$

For the present embodiment, the likelihood metric generator thus designates the core parameter for the $k^{th}$ signal cluster as the computed centroid or center of mass $c_k$.

According to a further exemplary embodiment, the likelihood metric generator 235a determines the variance parameters for each of the signal clusters (e.g., based on variances with respect to the signal points of the signal cluster and the associated signal constellation point) (S509). For example, based on the foregoing exemplary computations with respect to centroids ($c_{k,real}$ and $c_{k,imag}$), the variances with respect to the $k^{th}$ signal cluster ($\sigma_{k,real}$ and $\sigma_{k,imag}$) may be represented as:

$$\sigma_{k,real} = \sqrt{\frac{1}{N_{train}}\sum_n (\text{real}\{y^k_{n,train}\} - c_{k,real})^2} \ ;$$

where $n = 0, 1, 2, \ldots N_{train} - 1$ $$\sigma_{k,imag} = \sqrt{\frac{1}{N_{train}}\sum_n (\text{imag}\{y^k_{n,train}\} - c_{k,imag})^2} \ ;$$

where $n = 0, 1, 2, \ldots N_{train} - 1$

For the present embodiment, the likelihood metric generator thus designates the variance parameter for the $k^{th}$ signal cluster as the computed variances ($\sigma_{k,real}$ and $\sigma_{k,imag}$).

According to yet a further exemplary embodiment, the likelihood metric generator 235a determines the correlation parameter for each of the signal clusters (e.g., based on cross-correlations with respect to the signal points of the signal cluster and the associated signal constellation point) (S511). For example, based on the foregoing exemplary computations with respect to the centroids ($c_{k,real}$ and $c_{k,imag}$) and the variances ($\sigma_{k,real}$ and $\sigma_{k,imag}$), the cross-correlation ($\rho_k$) with respect to the $k^{th}$ signal cluster may be represented as:

$$\rho_k = \frac{1}{\sigma_{k,real}\sigma_{k,imag}}\sqrt{\frac{1}{N_{train}}\sum_n (\text{real}\{y^k_{n,train}\} - c_{k,real})(\text{imag}\{y^k_{n,train}\} - c_{k,imag})}$$

For the present embodiment, the likelihood metric generator thus designates the correlation parameter for the $k^{th}$ signal cluster as the computed cross-correlation ($\rho_k$).

With reference again to FIG. 4, based on the foregoing determinations of the core, variance and correlation parameters, the following discusses exemplary embodiments for the determination of the likelihood metrics for a particular transmitted signal constellation point and the corresponding source symbol. For such exemplary embodiments: the output of the equalizer 233a (the sample representations with respect to the received signal constellation point transmissions) is represented as $y_n = y_m(((n+\epsilon_m)T_s)$, $n=0, 1, 2, \ldots N_s-1$; one of M nominal signal constellation points is represented as $s_k = s_{k,real}+js_{k,imag}$; and the centroids for the respective signal clusters are represented as $c_k$, $k=1, 2, \ldots M$.

According to an exemplary embodiment, the likelihood metric generator 235a generates the likelihood metrics by determining conditional probability density functions (PDFs) for the transmitted signal constellation point based on the sample representation with respect to a particular received signal constellation point transmission ($y_n$) and the core, variance and correlation parameters associated with each of the signal clusters or constellations points. Each conditional PDF, for example, comprises a metric that indicates the likelihood that $y_n$, with respect to a particular sample representation for a received signal constellation point transmission, reflects the centroid ($c_n$) associated with a respective signal cluster (the $k^{th}$ signal cluster). Hence, the likelihood metric generator determines a number of such PDF metrics for each $y_n$ (depending on the employed modulation scheme), where each PDF metric corresponds to a different one of the signal clusters, and is based on $y_n$ and the core, variance and correlation parameters for the associated signal cluster. For example, the determination of the conditional PDFs may be represented as:

$$\log p(y_n|s_k) = \log p(y_n|c_k) =$$

$$f(y_n|c_k) = \left\{\frac{-1}{2(1-\rho_k^2)}\left[\left(\frac{\text{real}\{y_n\} - c_{k,real}}{\sigma_{k,real}}\right)^2 + \left(\frac{\text{imag}\{y_n\} - c_{k,imag}}{\sigma_{k,imag}}\right)^2 - 2\rho_k\left(\frac{\text{real}\{y_n\} - c_{k,real}}{\sigma_{k,real}}\right)\left(\frac{\text{imag}\{y_n\} - c_{k,imag}}{\sigma_{k,imag}}\right)\right]\right\} +$$

$$\log\left(\frac{1}{2\pi\sqrt{1-\rho_k^2}\,\sigma_{k,real}\sigma_{k,imag}}\right).$$

Accordingly, in the case of the 16 APSK signal constellation, 16 likelihood metrics or conditional PDFs are determined for the particular transmitted signal constellation point, where each conditional PDF corresponds to (is based on) the sample representation with respect to the received signal constellation point transmission and the determined core, variance and correlation parameters associated with a different one of each of the 16 signal clusters.

According to a further exemplary embodiment, a simplified method for determining the likelihood metrics or conditional PDFs with respect to the transmitted signal constellation point is provided, where the simplified determination is based on the sample representations with respect to the received signal constellation point transmissions and only the core parameters associated with the signal clusters. The conditional PDFs for a particular received signal constellation point transmission ($y_n$) are determined based on the sample representation with respect to the received signal constellation point transmission and the core parameters associated with each of the signal clusters. For example, the likelihood metric generator 235a first determines a correction factor for the output of the equalizer 233a, which is based on the core parameters (the determined centroids) for the signal constellation points, which can be represented as:

$$\gamma_{real} = \frac{1}{M}\sum_{k=1}^M c_{k,real}/s_{k,real}$$

$$\gamma_{imag} = \frac{1}{M}\sum_{k=1}^M c_{k,imag}/s_{k,imag}$$

Next, the likelihood metric generator scales the output of the equalizer, as follows:

$$y'_{n,real} = \text{real}\{y_n\}/\gamma_{real}$$

$$y'_{n,imag} = \text{imag}\{y_n\}/\gamma_{imag}$$

The likelihood metric generator then determines the likelihood metrics or conditional PDFs as follows:

$$\log p(y'_n|s_k) = -\frac{1}{2\sigma^2}[(y'_{n,real} - s_{k,real})^2 + (y'_{n,imag} - s_{k,imag})^2],$$

where $\sigma^2$ is determined from the signal to noise ratio.

The likelihood metric generator 235a then uses the likelihood metrics or conditional PDFs (resulting from the foregoing exemplary computations based on the core, variance and correlation parameters, or the simplified computations based on only the core parameters) to determine the associated improved log-likelihood ratios with respect to the particular transmitted constellation point (reflecting the corresponding source data symbol). According to one embodiment, the likelihood metric generator determines the improved log-likelihood ratios with respect to the particular transmitted constellation point, as follows:

$$z[i] = \log\frac{P(b[i]=1\mid y_n)}{P(b[i]=0\mid y_n)} = \log\sum_{s_k\in s_i^{(1)}}\exp(f(y_n\mid c_k)) - \log\sum_{s_k\in s_i^{(0)}}\exp(f(y_n\mid c_k));$$

where the set $S_i^{(1)}$ contains all symbols labeled with b[i]=1, and
the set $S_i^{(0)}$ contains all symbols labeled with b[i]=0.
z[i] represents a log-likelihood ratio, which indicates whether a bit is likely to be of a logic value "1" or a logic value "0". The log-likelihood ratio comprises a real number, which, for practical purposes may also be quantized to some integer value. Accordingly, because the decoder operates on the bit-level as opposed to the symbol-level, the receiver must map the information of the $f(y_n\mid c_k)$, which is at the symbol-level, to the bit-level. The determined improved log-likelihood ratios are then passed to the decoder 237a (and may optionally be deinterleaved prior to being passed on to the decoder).

The exemplary embodiments of the present invention thereby provide for an improved system and algorithms for interference compensation by accounting for imaginary and real components of the input that are correlated, and for distortion in clusters that are elliptical. Further, the exemplary embodiments of the present invention account for the differences in variances actually experienced from one cluster to another (different variances experienced with respect to the clusters of the different constellation points). Whereas, typically (e.g., in prior art systems) the computation of the decoder input assumes that the imaginary and real components of the input are uncorrelated, and have the same variance. Further, the distortion clusters are circular and equal for different constellation points (as opposed to the actual relatively elliptical shapes accommodated for by the improved algorithms of exemplary embodiments of the present invention). For instance, traditional methods determine the LLR as:

$$p_{x_{I,n}x_{Q,n}} = \frac{1}{2\pi\sigma^2}\exp\left\{\frac{1}{2\sigma^2}[(x_{I,n}-\mu_I)^2 + (x_{Q,n}-\mu_Q)^2]\right\}$$

FIGS. 6A-6D illustrate compared coded frame error rates with respect to a plurality of implementations of an interference compensation system and algorithms, for a three-carrier system sharing a single HPA, in accordance with exemplary embodiments. A Monte-Carlo simulation was performed to demonstrate various embodiments. The simulations considered a case having three carriers modulated by 16APSK with non-uniform spacing in frequency, such that:

$f_1=1.4772/T_s, f_2=2.6135/T_s,$ and $f_3=3.7498/T_s$

The carrier symbol rate is:

$$R_s = \frac{1}{T_s} = 220\text{ Msps}$$

The transmit and receive filters (e.g., filters 211, filters 229, respectively) were a matched pair of root-raised cosine (RRC) filters with a roll-off factor of 0.1. The nonlinear satellite transponder HPA model shared by the three modulated carriers is a linearized traveling-wave tube amplifier (TWTA). An LDPC code with codeblock length $N_c$=64800 bits and a LDPC code rate of ¾ is used for forward error correction.

Performance of the various embodiments is quantified in terms of the total degradation concept incurred at a target bit error rate (BER) as a function output back-off (OBO). The OBO is defined as the loss in power relative to saturation of the modulated signal, and is measured at the receiver RRC filter (e.g., filter 229a) output after sampling. In one embodiment, such an output after sampling is defined as:

$$x_m((n+\epsilon_m)T_s)$$

Specifically, the total degradation, TD (in dB), is:

$$TD(\text{dB}) = OBO(\text{dB}) + \frac{E_b}{N_0}\bigg|_{NL,2}(\text{dB}) - \frac{E_b}{N_0}\bigg|_{L,1}(\text{dB}),$$

where the per bit SNR required when nonlinear HPA is shared by two carriers is:

$$\frac{E_b}{N_0}\bigg|_{NL,2},$$

and
a counterpart perbit SNR when a perfectly linear HPA is used by a single carrier is:

$$\frac{E_b}{N_0}\bigg|_{L,1}$$

The minimum value of the total degradation, $TD_{min}$, occurring at the optimum modulated OBO, $OBO_{opt}$, is used as the performance figure-of-merit. For the adaptation part of the simulation, filter taps are obtained using a training sequence spanning 4,000 symbols. Performance is expected to improve with a longer training sequence.

Figure 6A:
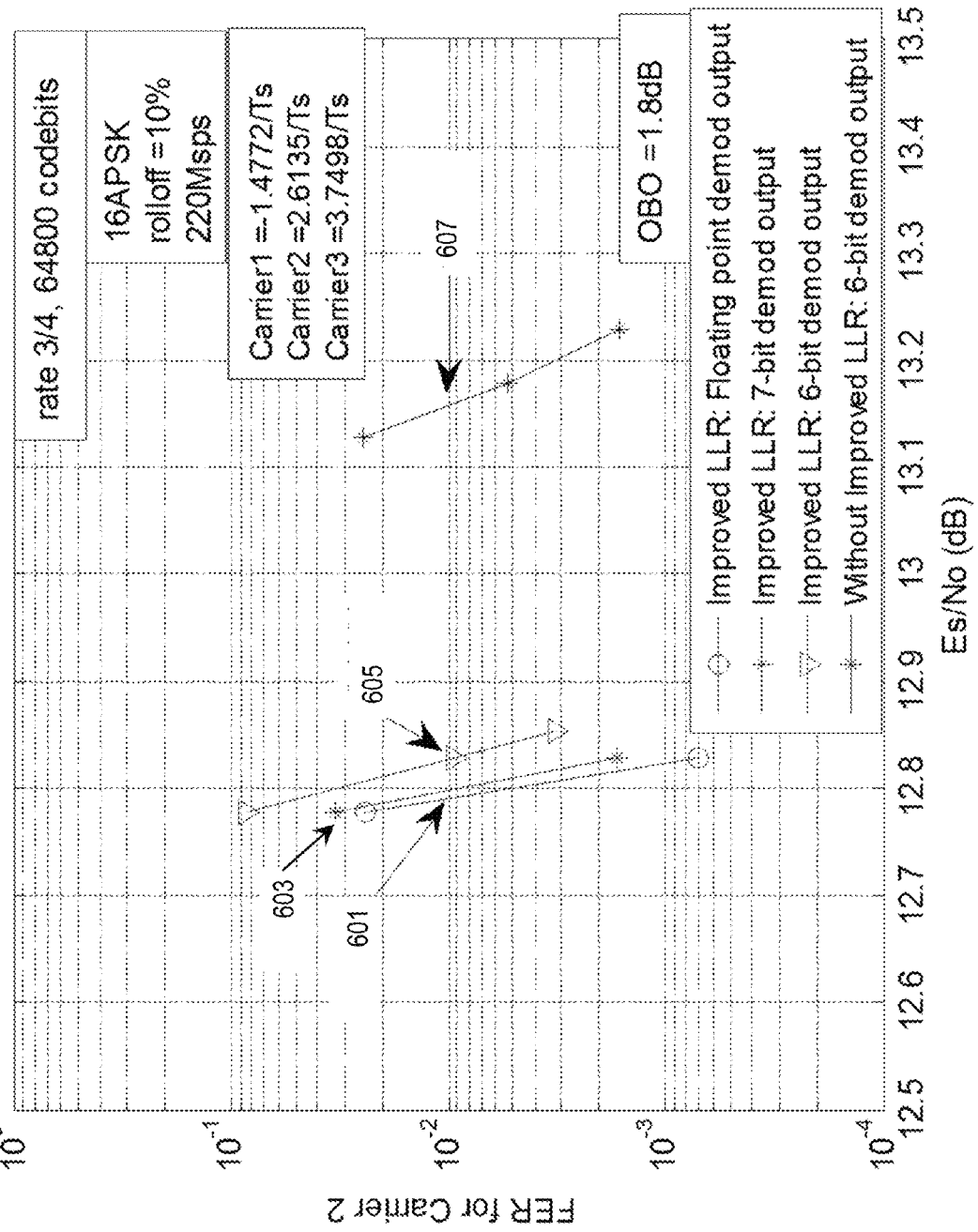
FIGS. 6A-6D illustrate compared coded frame error rates with respect to a plurality of implementations of an interference compensation system and algorithms, for a three-carrier system sharing a single HPA, in accordance with exemplary embodiments.

Referring to FIG. 6A, the OBO is set at 1.8 dB. Additionally, a 6 bit quantization is applied to the LLRs at the input to the LDPC decoder. As illustrated, a first result 601 shows an improved LLR using a floating point demodulated output having a symbol to noise rate ($E_s/N_o$) of 12.791 at a frame error rate (FER) of 0.01. A second result 603 shows an improved LLR using a 7-bit demodulation output, having similar results to the first result 601. A third result 605 shows an improved LLR using a 6-bit demodulation output with a having an $E_s/N_o$ of 13.1581 at a FER of 0.01. A fourth result 607 shows traditional results (e.g., without an improved LLR), having an $E_s/N_o$ of 13.1581 at a FER of 0.01. As such, the results (e.g., 601-607) indicate a gain of 0.34 dB at an FER of 0.01, with larger gains at lower FERs. The results also indicate only a marginal loss in performance using quantized equalizer outputs.

Figure 6B:
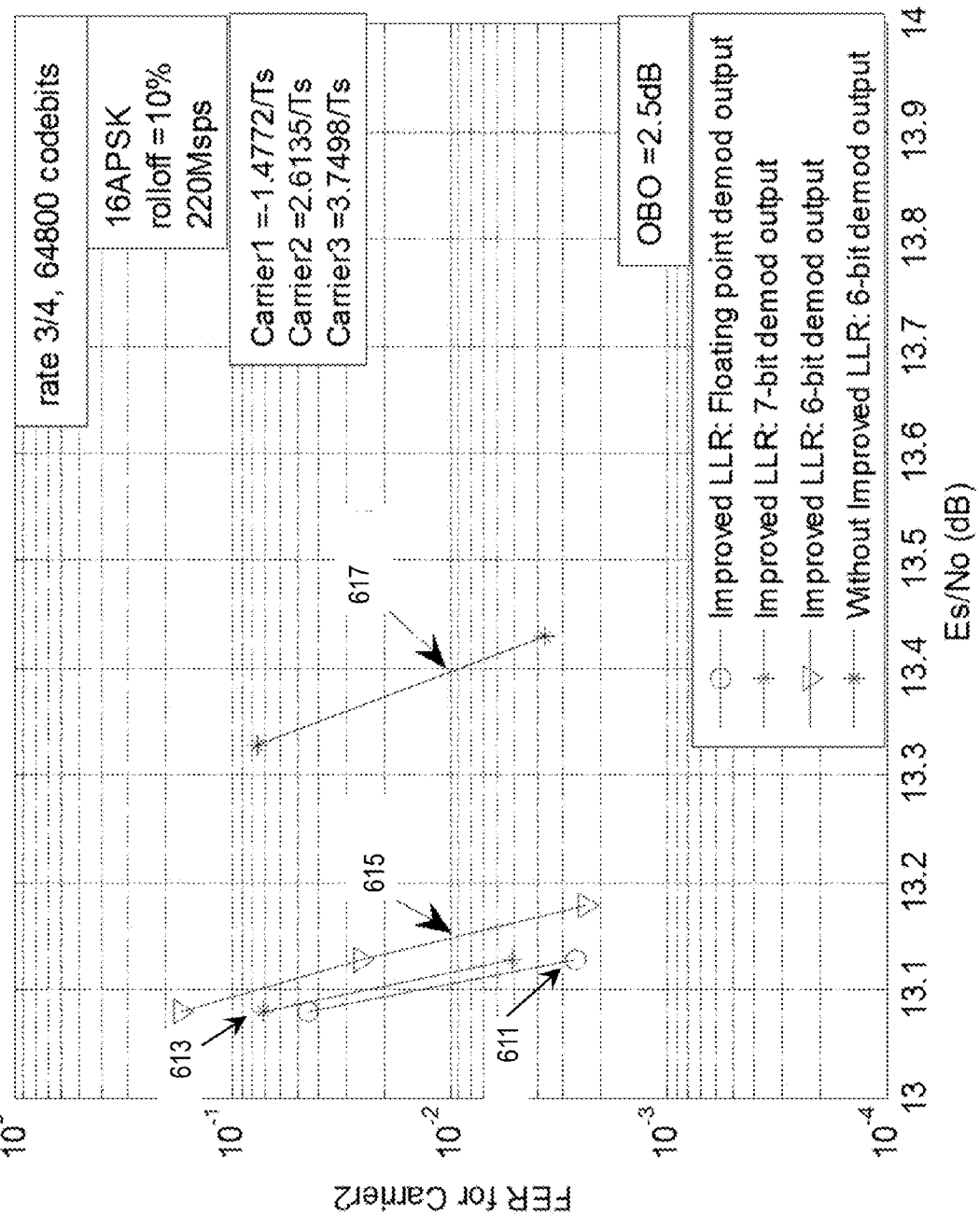

Referring to FIG. 6B, the OBO is set at 2.5 dB. The parameters of the simulation shown in FIG. 6B is otherwise similar to the simulation shown in FIG. 6A. As illustrated, a first result 611 shows an improved LLR using a floating point demodulated output having an $E_s/N_o$ of 13.1 at a frame error rate (FER) of 0.01. A second result 613 shows an improved LLR using a 7-bit demodulation output, having similar results to the first result 611. A third result 613 shows an improved LLR using a 6-bit demodulation output with a having an $E_s/N_o$ of 13.148 at a FER of 0.01. A fourth result 615 shows traditional results (e.g., without an improved LLR), having an $E_s/N_o$ of 13.398 at a FER of 0.01. As such, the results (e.g., 611-617) indicate a gain of 0.25 dB at an FER of 0.01, with larger gains at lower FERs. The results also indicate only a marginal loss in performance using quantized equalizer outputs.

Figure 6C:
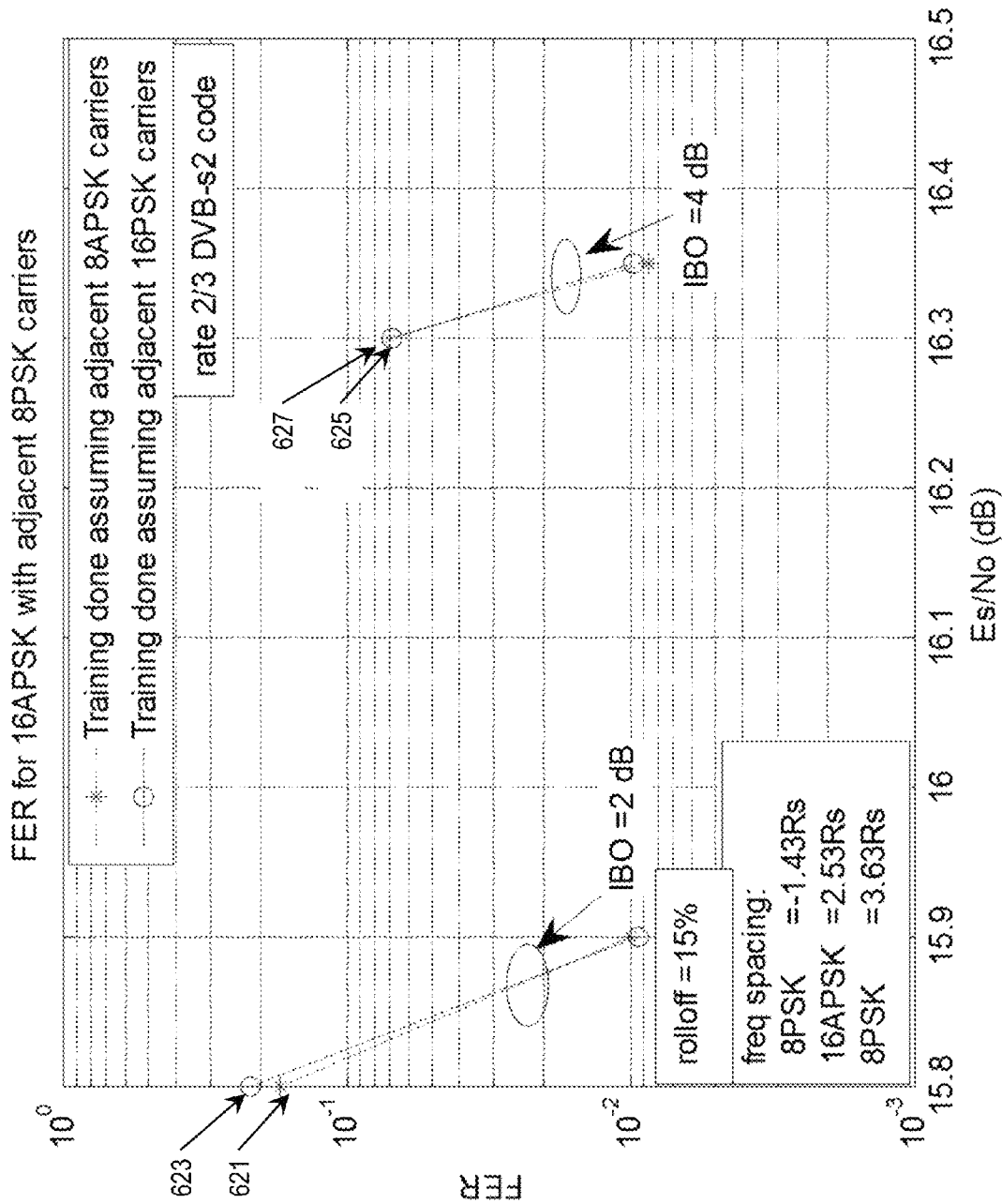

FIG. 6C illustrates a robustness of various embodiments to a mismatch in a training condition. Specifically, a training condition is calculated for a 16APSK carrier at $f_2$ using a rate 2/3 LDPC code by transmitting 16APSK carriers on $f_1$ and $f_3$ during training mode and then applying them to compute the improved decoder inputs for 16 APSK carriers on $f_2$ when in fact 8PSK carriers are present on $f_1$ and $f_3$. A roll-off factor of 0.15 is used. Where $f_1$, $f_2$, and $f_3$ are:

$$f_1 = 1.43/T_s, f_2 = 2.53/T_s, \text{ and } f_3 = 3.63/T_s$$

As shown, result 621 shows an improved LLR using training done assuming adjacent 8APSK carriers and result 623 shows an improved LLR using training done assuming adjacent 16PSK carriers for an input back off (IBO) level of 2 dB. Additionally, result 625 shows an improved LLR using training done assuming adjacent 8APSK carriers and result 627 shows an improved LLR using training done assuming adjacent 16PSK carriers for an input back off (IBO) level of 4 dB. The results (e.g., result 621-627) indicate that various embodiments are robust to a mismatch in the training condition, since no performance loss is observed relative to the case when $c_k$, $\sigma_k$, $\rho_k$ are determined assuming 8PSK adjacent carriers.

Figure 6D:
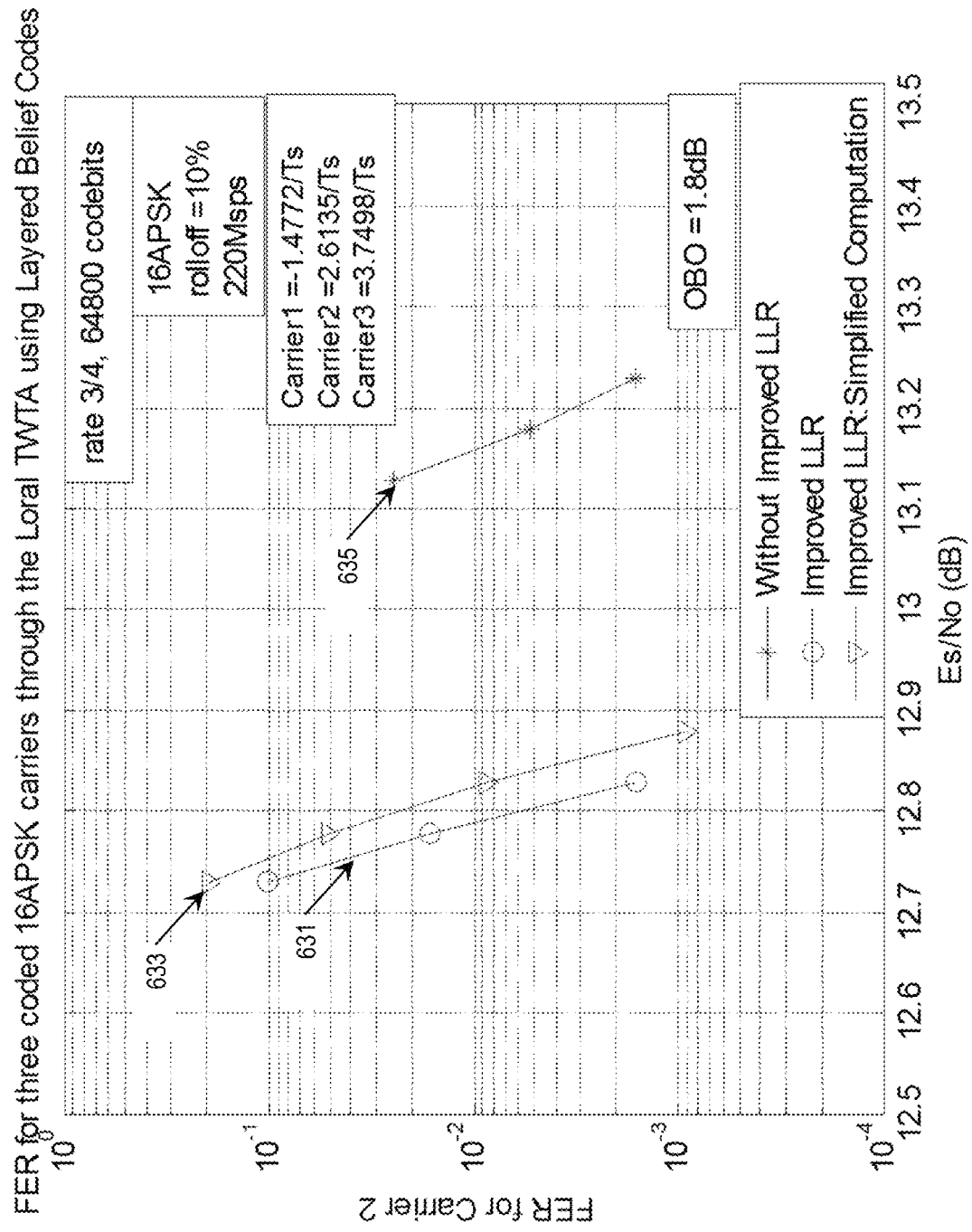

FIG. 6D illustrates the coded FER using a simplified computation (e.g., without determining variance and cross variance) at an OBO of 1.8 dB. As shown, result 631 is determined using an improved LLR that incorporates a variance and cross variance in determining an LLR, result 633 is determined using an improved LLR that does not incorporate variance and cross variance in determining an LLR, and result 635 is determined using a traditional LLR (e.g., without an improved LLR). The performance gap between results 631 and 633 is less than 0.03 dB. Thus, embodiments using the simplified computations are also significant improvements over traditional methods. Furthermore, the performance advantage with the full-complexity (e.g., result 631) is expected to increase as the nonlinear distortion is increased.

Figure 7:
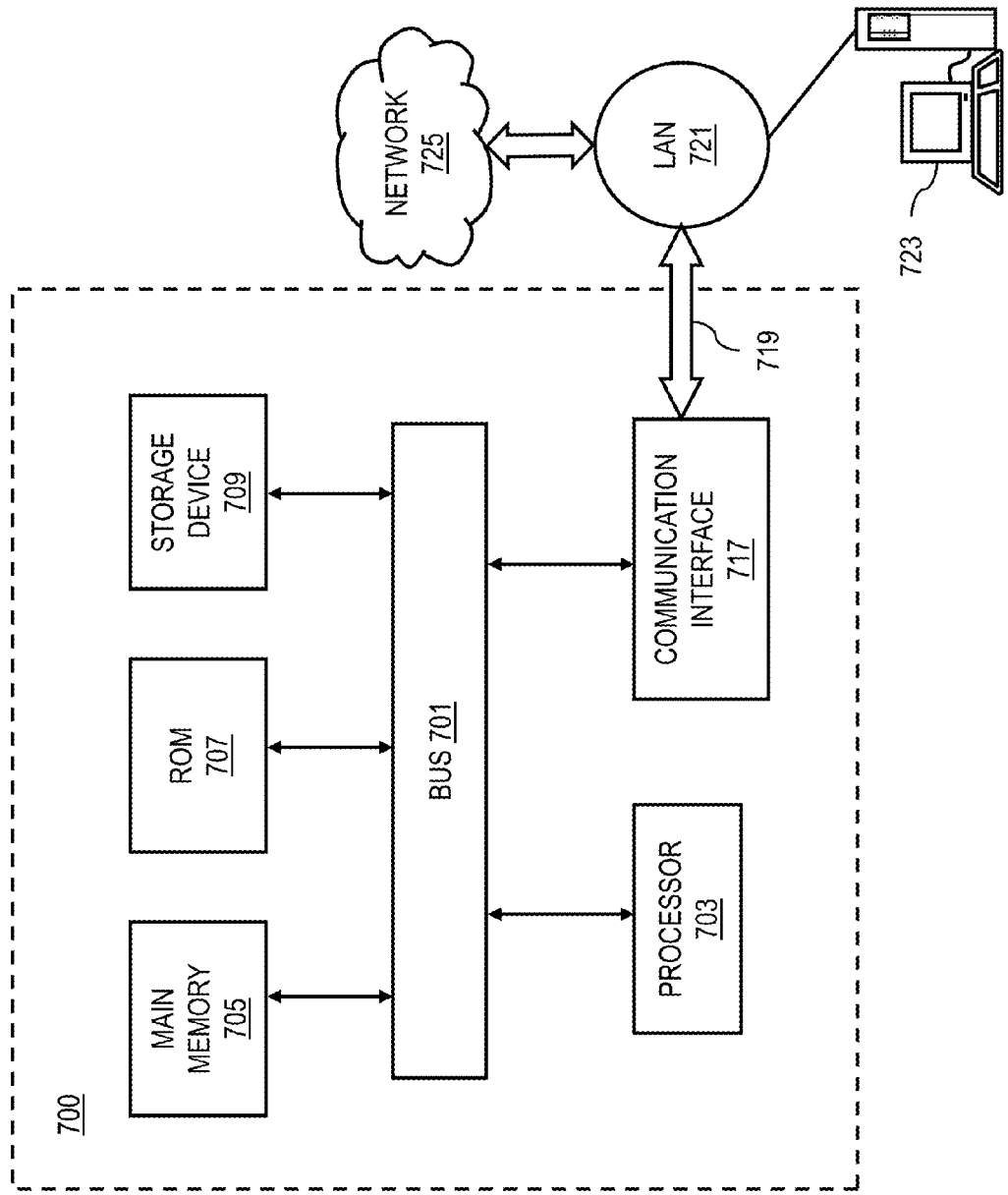
FIG. 7 illustrates a computer system upon which exemplary embodiments according to the present invention can be implemented.

FIG. 7 illustrates a computer system upon which exemplary embodiments according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

According to one embodiment of the invention, implementations of an interference compensation system and algorithms, in accordance with exemplary embodiments, are provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry is used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g., for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717, for example, includes peripheral interface devices, such as a Universal Serial Bus (USB) interface, a PCMCIA (Personal Computer Memory Card International Association) interface, etc.

The network link 719 typically provides data communication through one or more networks to other data devices. For example, the network link 719 provides a connection through local network 721 to a host computer 723, which has connectivity to a network 725 (e.g., a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 sends messages and receives data, including program code, through the network(s), network link 719, and communication interface 717. In the Internet example, a server (not shown) might transmit requested code belonging to an application program for implementing an embodiment of the present invention through the network 725, local network 721 and communication interface 717. The processor 703 executes the transmitted code while being received and/or store the code in storage device 239, or other non-volatile storage for later execution. In this manner, computer system 700 obtains application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as storage device 709. Volatile media may include dynamic memory, such as main memory 705. Transmission media may include coaxial cables, copper wire and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 8:
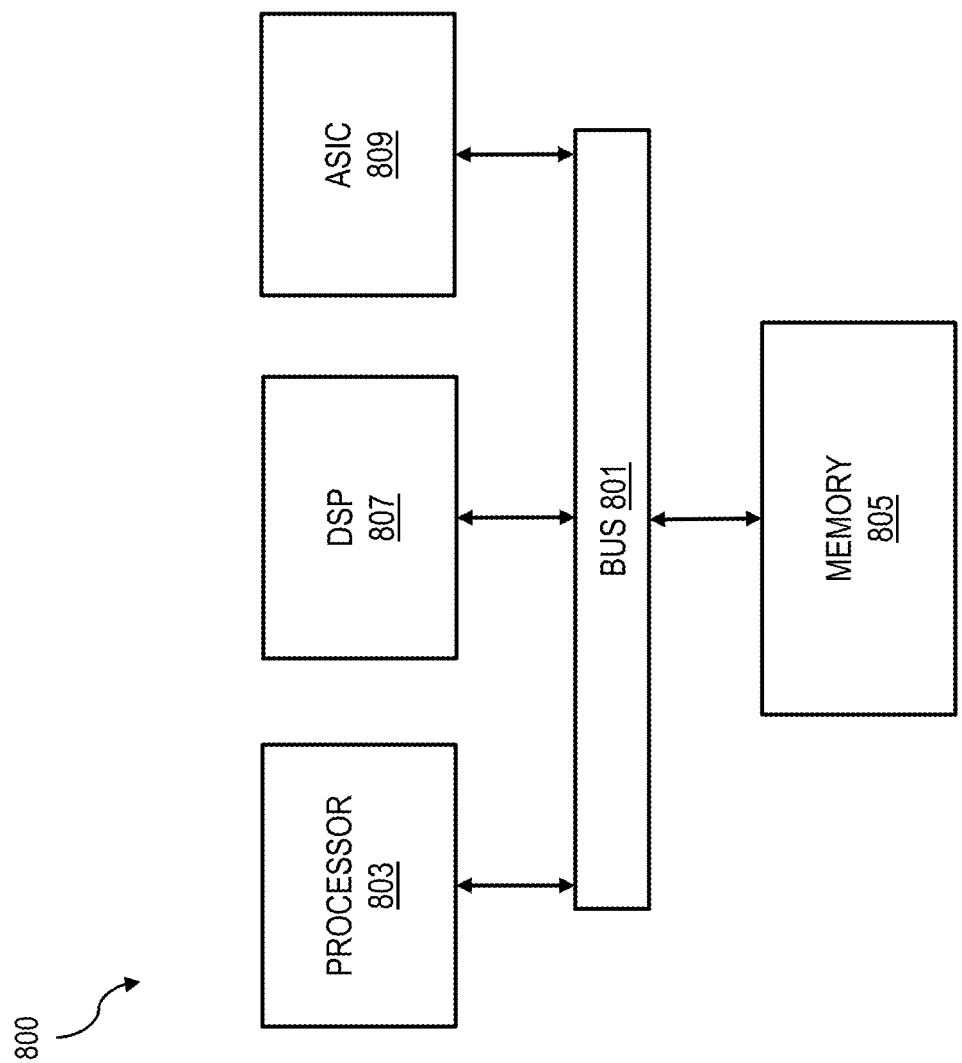
FIG. 8 is a diagram of a chip set that can be utilized in implementing an interference compensation system, according to exemplary embodiments.

FIG. 8 illustrates a chip set 800 in which embodiments of the invention may be implemented. Chip set 800 includes, for instance, processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 includes one or more processing cores with each core configured to perform independently. A multi-core processor enables multiprocessing within a single physical package. Examples of a multi-core processor include two, four, eight, or greater numbers of processing cores. Alternatively or in addition, the processor 803 includes one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, and/or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM) and static memory (e.g., ROM) for storing executable instructions that, when executed by the processor 803 and/or the DSP 807 and/or the ASIC 809, perform the process of exemplary embodiments as described herein. The memory 805 also stores the data associated with or generated by the execution of the process.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

receiving, by a receiver, a first signal, wherein the first signal comprises a modulated source signal transmitted on a first carrier over a communications channel, wherein the modulated source signal reflects a first source symbol mapped to a one of a plurality of signal constellation points, wherein each signal constellation point is associated with a different one of a plurality of signal clusters, wherein each signal cluster reflects interference and/or noise effects with respect to the associated signal constellation point;

acquiring, from the received first signal, a received representation of the modulated source signal with respect to the first source symbol; and determining a plurality of first likelihood metrics, wherein each first likelihood metric is based on the received representation of the modulated source signal with respect to the first source symbol and a different one of a plurality of core parameters, wherein each core parameter is based on a centroid estimate with respect to a different one of the signal clusters.

2. The method of claim 1, further comprising:

determining the one signal constellation point and the first source symbol based on one or more of the first likelihood metrics.

3. The method of claim 1, further comprising:

determining one or more bit-level first likelihood metrics based on one or more of the first likelihood metrics; and determining one or more code-bits associated with the one signal constellation point and the first source symbol based on one or more of the bit-level first likelihood metrics.

4. The method of claim 1, wherein the communications channel comprises a multi-carrier channel, and the interference and/or noise effects result at least in part from one or more other source signals simultaneously transmitted on other carriers over the multi-carrier channel.

5. The method of claim 4, wherein the receiver comprises a single carrier receiver, and wherein the core parameters and the determination of the first likelihood metrics do not require information characterizing the other source signals simultaneously transmitted on other carriers over the multi-carrier channel.

6. The method of claim 1, wherein each first likelihood metric is further based on a different one of a plurality of variance parameters, wherein each variance parameter is based on a variance estimate with respect to a different one of the signal clusters.

7. The method of claim 6, wherein each variance parameter relates to a shape of the respective signal cluster.

8. The method of claim 1, wherein each first likelihood metric is further based on a different one of a plurality of correlation parameters, wherein each correlation parameter is based on a correlation estimate with respect to a different one of the signal clusters.

9. The method of claim 8, wherein each correlation parameter relates to a rotation or warping of the respective signal cluster.

10. The method of claim 1, wherein each first likelihood metric is further based on:
  a different one of a plurality of variance parameters, wherein each variance parameter is based on a variance estimate with respect to a different one of the signal clusters; and
  a different one of a plurality of correlation parameters, wherein each correlation parameter is based on a correlation estimate with respect to a different one of the signal clusters.

11. The method of claim 10, further comprising:
  determining the one signal constellation point and the first source symbol based on one or more of the first likelihood metrics.

12. The method of claim 10, further comprising:
  determining one or more bit-level first likelihood metrics based on one or more of the first likelihood metrics; and
  determining one or more code-bits associated with the one signal constellation point and the first source symbol based on one or more of the bit-level first likelihood metrics.

13. The method of claim 10, wherein the communications channel comprises a multi-carrier channel, and the interference and/or noise effects result at least in part from one or more other source signals simultaneously transmitted on other carriers over the multi-carrier channel.

14. The method of claim 13, wherein the receiver comprises a single carrier receiver, and wherein the core parameters, variance parameters and correlation parameters and the determination of the first likelihood metrics do not require information characterizing the other source signals simultaneously transmitted on other carriers over the multi-carrier channel.

15. The method of claim 1, wherein the modulated source signal further reflects a second source symbol mapped to a further one of the plurality of signal constellation points, the method further comprising:
  acquiring, from the received first signal, a received representation of the modulated source signal with respect to the second source symbol; and
  determining a plurality of second likelihood metrics, wherein each second likelihood metric is based on the received representation of the modulated source signal with respect to the second source symbol and a different one of the core parameters.

16. The method of claim 15, further comprising:
  determining the further signal constellation point and the second source symbol based on one or more of the second likelihood metrics.

17. The method of claim 15, further comprising:
  determining one or more bit-level second likelihood metrics based on one or more of the second likelihood metrics; and
  determining one or more code-bits associated with the further signal constellation point and the second source symbol based on one or more of the bit-level second likelihood metrics.

18. The method of claim 15, wherein the interference and/or noise effects reflected by the signal cluster associated with the one signal constellation point differ from the interference and/or noise effects reflected by the signal cluster associated with the further signal constellation point, and the first likelihood metrics differ from the second likelihood metrics in a manner that accommodates for the differences between the interference and/or noise effects reflected by the signal cluster associated with the one signal constellation point and the interference and/or noise effects reflected by the signal cluster associated with the further signal constellation point.

19. The method of claim 15, wherein each second likelihood metric is further based on a different one of a plurality of variance parameters, and wherein each variance parameter is based on a variance estimate with respect to a different one of the signal clusters.

20. The method of claim 15, wherein each second likelihood metric is further based on a different one of a plurality of correlation parameters, and wherein each correlation parameter is based on a correlation estimate with respect to a different one of the signal clusters.

21. The method of claim 15, wherein each second likelihood metric is further based on a different one of a plurality of variance parameters and a different one of a plurality of correlation parameters, and wherein each variance parameter is based on a variance estimate with respect to a different one of the signal clusters and each correlation parameter is based on a correlation estimate with respect to a different one of the signal clusters.

22. The method of claim 1, further comprising:
  receiving, by the receiver, a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;
  acquiring, from the received training signal, a received representation of the modulated source training signal with respect to each of the repeated transmissions of each of the source symbols;
  determining the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster; and determining the centroid estimate with respect to each signal cluster based on a centroid or center of mass with respect to the signal points of the signal cluster.

23. The method of claim 22, further comprising:
determining the one signal constellation point and the first source symbol based on one or more of the first likelihood metrics.

24. The method of claim 22, further comprising:
determining one or more bit-level first likelihood metrics based on one or more of the first likelihood metrics; and
determining one or more code-bits associated with the one signal constellation point and the first source symbol based on one or more of the bit-level first likelihood metrics.

25. The method of claim 6, further comprising:
receiving, by the receiver, a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;
acquiring, from the received training signal, a received representation of the modulated source training signal with respect to each of the repeated transmissions of each of the source symbols;
determining the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster;
determining the centroid estimate with respect to each signal cluster based on a centroid or center of mass with respect to the signal points of the signal cluster; and
determining the variance estimate with respect to each signal cluster based on variances with respect to the signal points of the signal cluster and the associated signal constellation point.

26. The method of claim 8, further comprising:
receiving, by the receiver, a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;
acquiring, from the received training signal, a received representation of the modulated source training signal with respect to each of the repeated transmissions of each of the source symbols;
determining the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster;
determining the centroid estimate with respect to each signal cluster based on a centroid or center of mass with respect to the signal points of the signal cluster; and
determining the correlation estimate with respect to each signal cluster based on cross-correlations with respect to the signal points of the signal cluster and the associated signal constellation point.

27. The method of claim 10, further comprising:
receiving, by the receiver, a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;
acquiring, from the received training signal, a received form of the modulated source training signal with respect to each of the repeated transmissions of each of the source symbols;
determining the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster;
determining the centroid estimate with respect to each signal cluster based on a centroid or center of mass with respect to the signal points of the signal cluster;
determining the variance estimate with respect to each signal cluster based on variances with respect to the signal points of the signal cluster and the associated signal constellation point; and
determining the correlation estimate with respect to each signal cluster based on cross-correlations with respect to the signal points of the signal cluster and the associated signal constellation point.

28. The method of claim 27, further comprising:
determining the one signal constellation point and the first source symbol based on one or more of the first likelihood metrics.

29. The method of claim 27, further comprising:
determining one or more bit-level first likelihood metrics based on one or more of the first likelihood metrics; and
determining one or more code-bits associated with the one signal constellation point and the first source symbol based on one or more of the bit-level first likelihood metrics.

30. An apparatus, comprising:
a receiver module configured to receive a first signal, wherein the first signal comprises a modulated source signal transmitted on a first carrier over a communications channel, wherein the modulated source signal reflects a first source symbol mapped to a one of a plurality of signal constellation points, wherein each signal constellation point is associated with a different one of a plurality of signal clusters, wherein each signal cluster reflects interference and/or noise effects with respect to the associated signal constellation point;

a signal acquisition module configured to acquire, from the received first signal, a received representation of the modulated source signal with respect to the first source symbol; and a computation module configured to determine a plurality of first likelihood metrics, wherein each first likelihood metric is based on the received representation of the modulated source signal with respect to the first source symbol and a different one of a plurality of core parameters, wherein each core parameter is based on a centroid estimate with respect to a different one of the signal clusters.

31. The apparatus of claim 30, further comprising:
a determination module configured to determine the one signal constellation point and the first source symbol based on one or more of the first likelihood metrics.

32. The apparatus of claim 30, wherein the computation module is further configured to determine one or more bit-level first likelihood metrics based on one or more of the first likelihood metrics, and wherein the apparatus further comprises:
a determination module configured to determine one or more code-bits associated with the one signal constellation point and the first source symbol based on one or more of the bit-level first likelihood metrics.

33. The apparatus of claim 30, wherein the communications channel comprises a multi-carrier channel, and the interference and/or noise effects result at least in part from one or more other source signals simultaneously transmitted on other carriers over the multi-carrier channel.

34. The apparatus of claim 33, wherein the apparatus comprises a single carrier receiver, and wherein the core parameters and the determination of the first likelihood metrics do not require information characterizing the other source signals simultaneously transmitted on other carriers over the multi-carrier channel.

35. The apparatus of claim 30, wherein each first likelihood metric is further based on a different one of a plurality of variance parameters, wherein each variance parameter is based on a variance estimate with respect to a different one of the signal clusters.

36. The apparatus of claim 35, wherein each variance parameter relates to a shape of the respective signal cluster.

37. The apparatus of claim 30, wherein each first likelihood metric is further based on a different one of a plurality of correlation parameters, wherein each correlation parameter is based on a correlation estimate with respect to a different one of the signal clusters.

38. The apparatus of claim 37, wherein each correlation parameter relates to a rotation or warping of the respective signal cluster.

39. The apparatus of claim 30, wherein each first likelihood metric is further based on:
a different one of a plurality of variance parameters, wherein each variance parameter is based on a variance estimate with respect to a different one of the signal clusters; and
a different one of a plurality of correlation parameters, wherein each correlation parameter is based on a correlation estimate with respect to a different one of the signal clusters.

40. The method of claim 39, further comprising:
a determination module configured to determine the one signal constellation point and the first source symbol based on one or more of the first likelihood metrics.

41. The apparatus of claim 39, wherein the computation module is further configured to determine one or more bit-level first likelihood metrics based on one or more of the first likelihood metrics, and wherein the apparatus further comprises:
a determination module configured to determine one or more code-bits associated with the one signal constellation point and the first source symbol based on one or more of the bit-level first likelihood metrics.

42. The apparatus of claim 39, wherein the communications channel comprises a multi-carrier channel, and the interference and/or noise effects result at least in part from one or more other source signals simultaneously transmitted on other carriers over the multi-carrier channel.

43. The apparatus of claim 42, wherein the apparatus comprises a single carrier receiver, and wherein the core parameters, variance parameters and correlation parameters and the determination of the first likelihood metrics do not require information characterizing the other source signals simultaneously transmitted on other carriers over the multi-carrier channel.

44. The apparatus of claim 30, wherein the modulated source signal further reflects a second source symbol mapped to a further one of the plurality of signal constellation points, and wherein:
the signal acquisition module is further configured to acquire, from the received first signal, a received representation of the modulated source signal with respect to the second source symbol; and
the computation module is further configured to determine a plurality of second likelihood metrics, wherein each second likelihood metric is based on the received representation of the modulated source signal with respect to the second source symbol and a different one of the core parameters.

45. The apparatus of claim 44, further comprising:
a determination module configured to determine the further signal constellation point and the second source symbol based on one or more of the second likelihood metrics.

46. The apparatus of claim 44, wherein the computation module is further configured to determine one or more bit-level second likelihood metrics based on one or more of the second likelihood metrics, and wherein the apparatus further comprises:
a determination module configured to determine one or more code-bits associated with the further signal constellation point and the second source symbol based on one or more of the bit-level second likelihood metrics.

47. The apparatus of claim 44, wherein the interference and/or noise effects reflected by the signal cluster associated with the one signal constellation point differ from the interference and/or noise effects reflected by the signal cluster associated with the further signal constellation point, and the first likelihood metrics differ from the second likelihood metrics in a manner that accommodates for the differences between the interference and/or noise effects reflected by the signal cluster associated with the one signal constellation point and the interference and/or noise effects reflected by the signal cluster associated with the further signal constellation point.

48. The apparatus of claim 44, wherein each second likelihood metric is further based on a different one of a plurality of variance parameters, and wherein each variance parameter is based on a variance estimate with respect to a different one of the signal clusters.

49. The apparatus of claim 44, wherein each second likelihood metric is further based on a different one of a plurality of correlation parameters, and wherein each correlation parameter is based on a correlation estimate with respect to a different one of the signal clusters.

50. The apparatus of claim 44, wherein each second likelihood metric is further based on a different one of a plurality of variance parameters and a different one of a plurality of correlation parameters, and wherein each variance parameter is based on a variance estimate with respect to a different one of the signal clusters and each correlation parameter is based on a correlation estimate with respect to a different one of the signal clusters.

51. The apparatus of claim 30, wherein:
the receiver module is further configured to receive a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;
the signal acquisition module is further configured to acquire, from the received training signal, a received representation of the modulated source training signal with respect to each of the repeated transmissions of each of the source symbols;
the computation module is further configured to determine the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster; and
the computation module is further configured to determine the centroid estimate with respect to each signal cluster based on a centroid or center of mass with respect to the signal points of the signal cluster.

52. The apparatus of claim 51, further comprising:
a determination module configured to determine the further signal constellation point and the second source symbol based on one or more of the second likelihood metrics.

53. The apparatus of claim 51, wherein the computation module is further configured to determine one or more bit-level second likelihood metrics based on one or more of the second likelihood metrics, and wherein the apparatus further comprises:
a determination module configured to determine one or more code-bits associated with the further signal constellation point and the second source symbol based on one or more of the bit-level second likelihood metrics.

54. The apparatus of claim 35, wherein:
the receiver module is further configured to receive a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;
the signal acquisition module is further configured to acquire, from the received training signal, a received representation of the modulated source training signal with respect to each of the repeated transmissions of each of the source symbols;
the computation module is further configured to determine the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster;
the computation module is further configured to determine the centroid estimate with respect to each signal cluster based on a centroid or center of mass with respect to the signal points of the signal cluster; and
the computation module is further configured to determine the variance estimate with respect to each signal cluster based on variances with respect to the signal points of the signal cluster and the associated signal constellation point.

55. The apparatus of claim 37, wherein:
the receiver module is further configured to receive a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;
the signal acquisition module is further configured to acquire, from the received training signal, a received representation of the modulated source training signal with respect to each of the repeated transmissions of each of the source symbols;
the computation module is further configured to determine the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster;
the computation module is further configured to determine the centroid estimate with respect to each signal cluster based on a centroid or center of mass with respect to the signal points of the signal cluster; and
the computation module is further configured to determine the correlation estimate with respect to each signal cluster based on cross-correlations with respect to the signal points of the signal cluster and the associated signal constellation point.

56. The apparatus of claim 39, further comprising:
the receiver module is further configured to receive a training signal, wherein the training signal comprises a modulated source training signal transmitted on the first carrier over the communications channel, wherein the modulated source training signal reflects a repeated transmission of each of a plurality of source symbols including the first source symbol, wherein each source symbol is linked with a different one of the signal constellation points and each repeated transmission of the source symbol is mapped to the linked constellation point;

the signal acquisition module is further configured to acquire, from the received training signal, a received form of the modulated source training signal with respect to each of the repeated transmissions of each of the source symbols;

the computation module is further configured to determine the signal clusters, wherein each signal cluster comprises a plurality of signal points, wherein each signal point of the signal cluster reflects the received representation of the modulated source training signal with respect to a different one of the repeated transmissions of the source symbol that is linked with the signal constellation point associated with the signal cluster;

the computation module is further configured to determine the centroid estimate with respect to each signal cluster based on a centroid or center of mass with respect to the signal points of the signal cluster;

the computation module is further configured to determine the variance estimate with respect to each signal cluster based on variances with respect to the signal points of the signal cluster and the associated signal constellation point; and the computation module is further configured to determine the correlation estimate with respect to each signal cluster based on cross-correlations with respect to the signal points of the signal cluster and the associated signal constellation point.

57. The apparatus of claim 56, further comprising:

a determination module configured to determine the further signal constellation point and the second source symbol based on one or more of the second likelihood metrics.

58. The apparatus of claim 56, wherein the computation module is further configured to determine one or more bit-level second likelihood metrics based on one or more of the second likelihood metrics, and wherein the apparatus further comprises:

a determination module configured to determine one or more code-bits associated with the further signal constellation point and the second source symbol based on one or more of the bit-level second likelihood metrics.

* * * * *